US012512251B2

(12) United States Patent
Afsharian et al.

(10) Patent No.: US 12,512,251 B2
(45) Date of Patent: Dec. 30, 2025

(54) STACKED MATRIX TRANSFORMER

(71) Applicant: Murata Manufacturing Co., Ltd., Nagaokakyo (JP)

(72) Inventors: Jahangir Afsharian, Markham (CA); Ning Zhu, Markham (CA); Bing Gong, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1073 days.

(21) Appl. No.: 17/613,782

(22) PCT Filed: Jun. 12, 2020

(86) PCT No.: PCT/US2020/037419
§ 371 (c)(1),
(2) Date: Nov. 23, 2021

(87) PCT Pub. No.: WO2020/252251
PCT Pub. Date: Dec. 17, 2020

(65) Prior Publication Data
US 2022/0230797 A1   Jul. 21, 2022

Related U.S. Application Data

(60) Provisional application No. 62/861,342, filed on Jun. 14, 2019.

(51) Int. Cl.
*H01F 27/28*   (2006.01)
*H01F 27/06*   (2006.01)
(Continued)

(52) U.S. Cl.
CPC ......... *H01F 27/2804* (2013.01); *H01F 27/06* (2013.01); *H01F 27/24* (2013.01);
(Continued)

(58) Field of Classification Search
CPC ...... H01F 27/2804; H01F 27/06; H01F 27/24; H01F 2027/065; H01F 2027/2809;
(Continued)

(56) References Cited

U.S. PATENT DOCUMENTS 7,705,705 B2   4/2010   Zeng et al.
8,476,859 B2   7/2013   Bortolus et al.
(Continued)

FOREIGN PATENT DOCUMENTS

KR   10-2004-0024724 A       3/2004
KR      20040024724 A   *   3/2004
KR   10-2005-0045751 A       5/2005

OTHER PUBLICATIONS

Official Communication issued in International Patent Application No. PCT/US2020/037419, mailed on Sep. 29, 2020.
(Continued)

*Primary Examiner* — Malcolm Barnes
(74) *Attorney, Agent, or Firm* — Keating & Bennett, LLP

(57) ABSTRACT

A transformer assembly includes a top core, a bottom core under the top core, a primary winding that is multi-layered and that extends around each of the top core and the bottom core, and a secondary winding that is multi-layered and that extends around each of the top core and the bottom core. The primary winding extends around the top core and the bottom core such that, when current flows in the primary winding, magnetic flux is canceled or substantially canceled in a region between the top core and the bottom core. A converter assembly includes the transformer assembly, a primary-side circuit including the primary windings, and a secondary-side circuit including the secondary windings.

20 Claims, 20 Drawing Sheets

(51) Int. Cl.
*H01F 27/24* (2006.01)
*H02M 3/00* (2006.01)
*H02M 3/33* (2006.01)
*H02M 3/335* (2006.01)

(52) U.S. Cl.
CPC ... *H02M 3/33576* (2013.01); *H01F 2027/065* (2013.01); *H01F 2027/2809* (2013.01); *H02M 3/003* (2021.05); *H02M 3/01* (2021.05); *H02M 3/33571* (2021.05)

(58) Field of Classification Search
CPC .... H02M 3/33576; H02M 3/003; H02M 3/01; H02M 3/33571
See application file for complete search history.

(56) References Cited

U.S. PATENT DOCUMENTS

| | | | |
|---|---|---|---|
| 2007/0152795 | A1 | 7/2007 | Zeng et al. |
| 2009/0085702 | A1* | 4/2009 | Zeng ................. H01F 27/292 336/107 |
| 2009/0267718 | A1* | 10/2009 | Nagano ................. H01F 27/006 336/65 |
| 2009/0295529 | A1* | 12/2009 | Silva ........................ H01F 3/10 336/212 |
| 2016/0307695 | A1* | 10/2016 | Jitaru ................. H01F 27/2804 |
| 2018/0068782 | A1 | 3/2018 | Afsharian et al. |
| 2018/0226182 | A1* | 8/2018 | Fe ........................ H01F 27/245 |

OTHER PUBLICATIONS

Huang et al., "LLC Resonant Converter With Matrix Transformer", IEEE Transactions on Power Electronics, vol. 29, No. 8, Aug. 2014, pp. 4339-4347.

Fei et al., "High-efficiency High-power-density 380V/12V DC/DC Converter with a Novel Matrix Transformer", Proc. IEEE APEC 2017, Mar. 26-30, 2017, pp. 2428-2435.

Huang et al., "Matrix Transformer for LLC Resonant Converters", IEEE, 2013, pp. 2078-2083.

Office Action in CN202080043661.6, mailed Apr. 26, 2024, 9 pages.

* cited by examiner

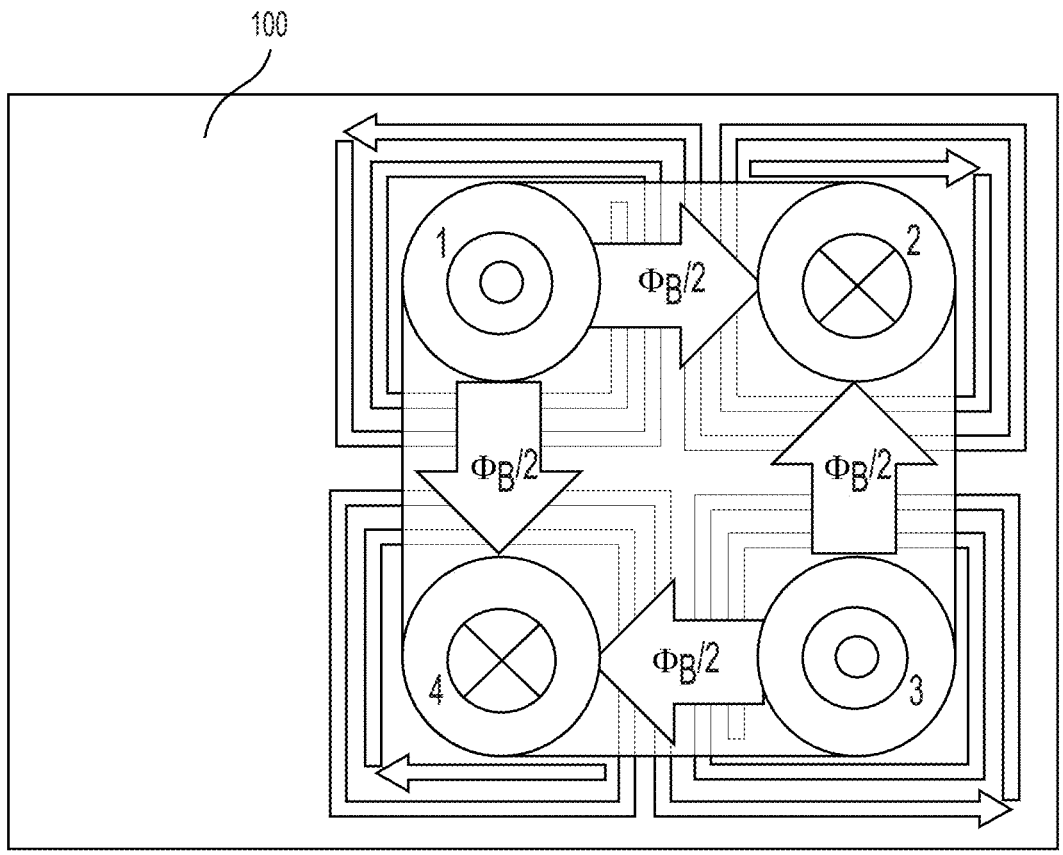
FIG. 6A *(PRIOR ART)*
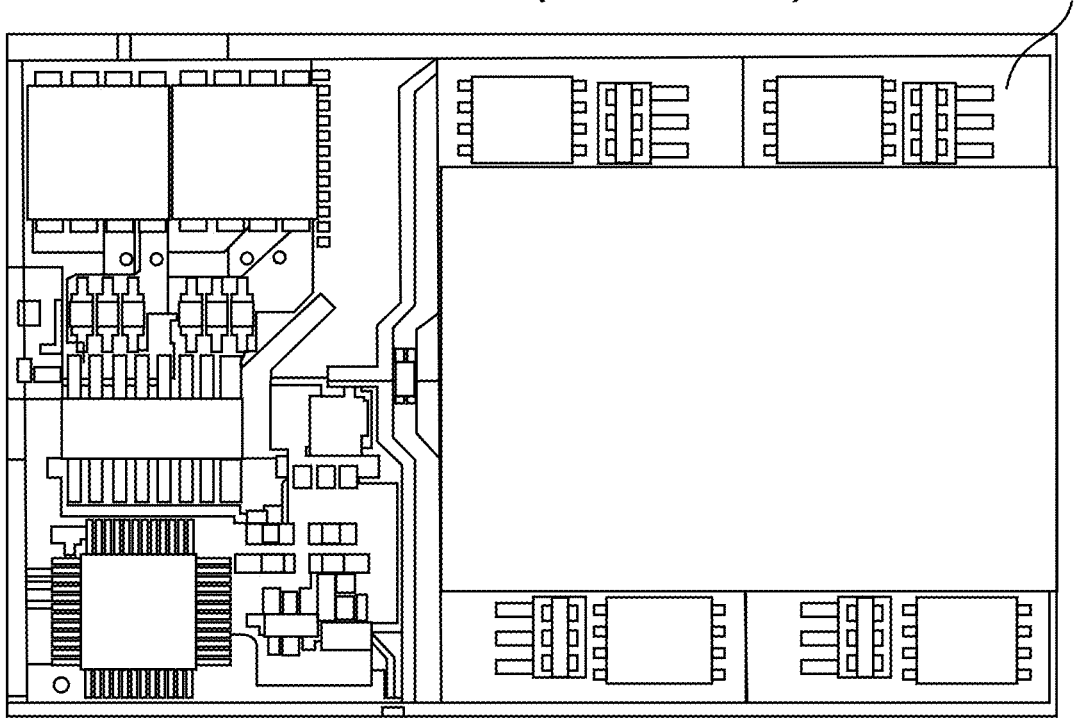
FIG. 6B *(PRIOR ART)*

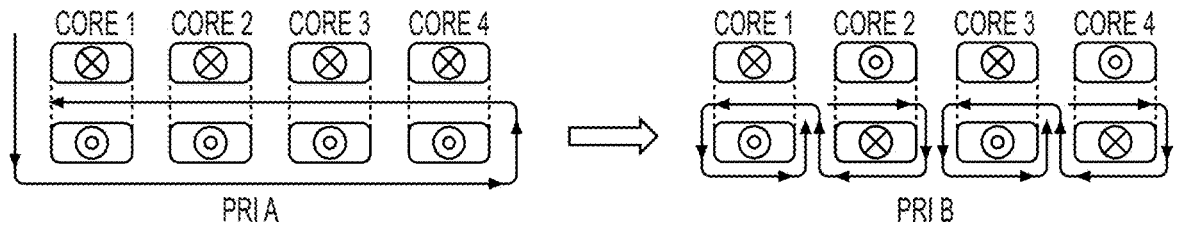
*FIG. 7A*  *FIG. 7B*
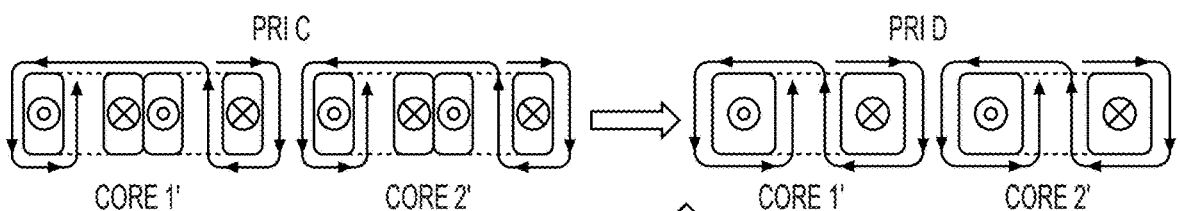
*FIG. 7C*  *FIG. 7D*
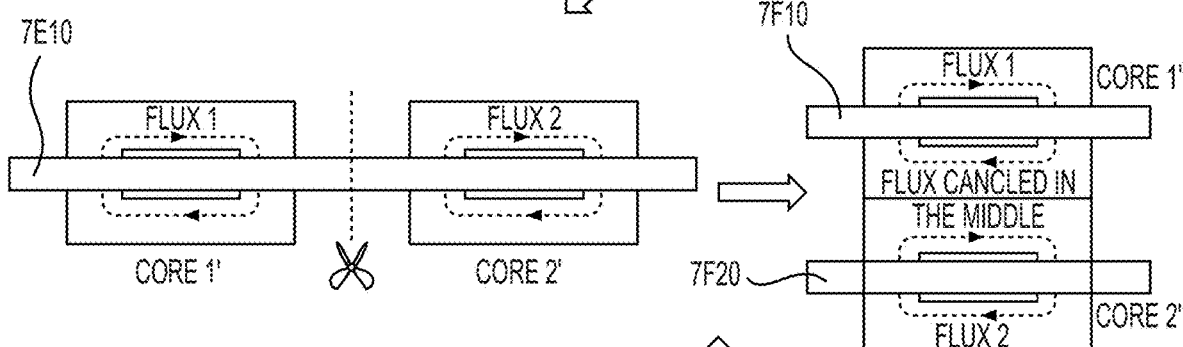
*FIG. 7E*  *FIG. 7F*
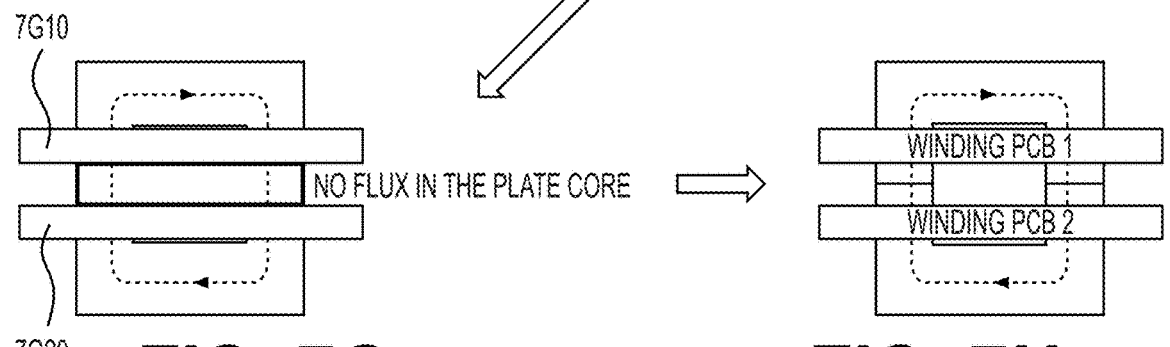
*FIG. 7G*  *FIG. 7H*

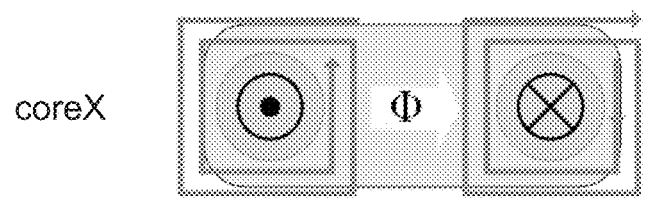
FIG. 19
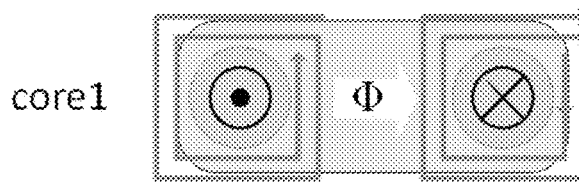
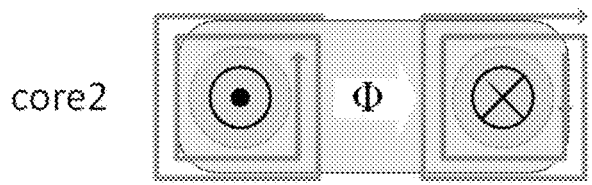
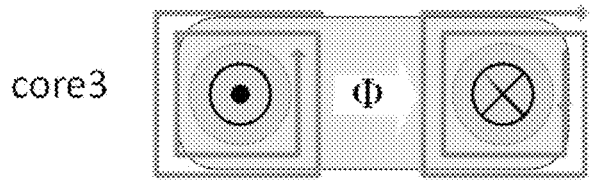
FIG. 20

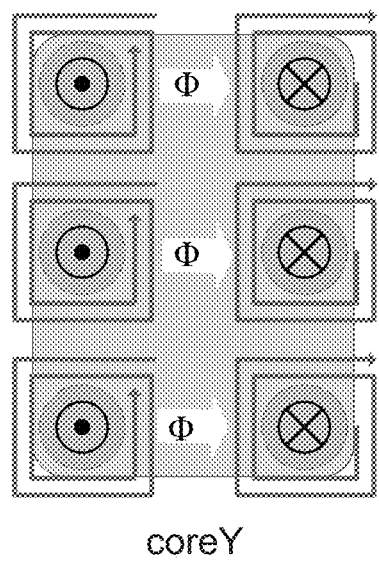 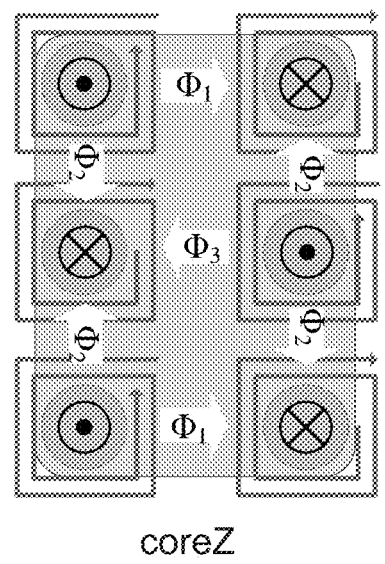
coreY          coreZ
FIG. 21A          *Fig. 21B*

STACKED MATRIX TRANSFORMER

CROSS REFERENCE TO RELATED APPLICATIONS

This application claims the benefit of U.S. Patent Application No. 62/861,342 filed on Jun. 14, 2019, the entire contents of which are hereby incorporated by reference.

BACKGROUND OF THE INVENTION

1. Field of the Invention

The present invention relates to transformers. More specifically, the present invention relates to stacked matrix transformers usable with DC/DC resonant converters.

2. Description of the Related Art

A half-bridge LLC converter is shown in FIG. 1. The half-bridge LLC converter shown in FIG. 1 can be used either with the known transformers discussed in this section or with the novel transformers according to the preferred embodiments of the present invention discussed in the Detailed Description of Preferred Embodiments section below.

FIG. 1 shows a typical application of a half-bridge DC-DC converter using an LLC series resonant circuit. In FIG. 1, "primary side" refers to the portion of the circuit on the left-hand side of the transformer T1 connected to the primary windings, and "secondary side" refers to the portion of the circuit on the right-hand side of the transformer T1 connected to the secondary windings. LLC refers to the passive components capacitor $C_r$, inductor $L_r$, and inductor $L_m$ connected to the primary side of the stacked transformer T1. The switches $Q_1$ and $Q_2$ are connected to the primary side of the transformer T1 and to input voltage $V_i$. The switches $Q_3$, $Q_4$ are connected to the secondary side of the transformer T1 as synchronous rectifiers (SRs). As shown in FIG. 1, the switches $Q_1$, $Q_2$, $Q_3$, $Q_4$ can be metal-oxide-semiconductor field-effect transistors (MOSFETs). Each of the switches $Q_3$, $Q_4$ can be a single switch (as shown in FIG. 1) or can be multiple switches connected in parallel (not shown in FIG. 1) and controlled by a controller CON. Switches connected in parallel means that the drains of the switches are connected together and that the sources of the switches are connected together. Output capacitor $C_O$ is connected to the secondary side of the transformer T1 in parallel with the output load. Output capacitor $C_o$ in FIG. 1 can include multiple capacitors connected in parallel.

The design of the transformer should be considered in high-power and high-current applications. To achieve high power density, a high switching frequency is used to reduce the size of the magnetic components, and high-frequency transformers should be designed with care. At high frequency, the skin depth effect and the proximity effect should be considered in designing the windings of the transformer. The skin depth effect and the proximity effect can generate large AC loss and large DC resistance loss. Further, the connection between the transformer's secondary windings and the switches $Q_3$, $Q_4$ should also be considered. The distance between the secondary windings and the SRs, i.e., switches $Q_3$, $Q_4$, should be reduced to reduce the parasitic impedance from the wires and ultimately to reduce termination loss.

U.S. Patent Application Publication No. 2018/0068782 discloses a design for high-frequency LLC converter transformers. The transformer assembly 200 shown in FIGS. 2 and 3 has interleaved windings with four printed circuit boards (PCBs) 205. The transformer assembly 200 includes the transformer 204 connected to the output-rectifier PCB 210. The transformer 204 includes magnetic core 203, primary windings 201 on PCBs 205 connected in series, and secondary windings 202 made of stamped copper 206 connected in parallel. FIG. 2 shows the transformer 204 before being connected to the output-rectifier PCB 210. The transformer 204 includes central terminals 220, left terminals 221, and right terminals 222 that can be soldered to corresponding pads 215 in the output-rectifier PCB 210. Preferably, the terminals 220, 221, 222 are not connected to pads 215 by a friction or interference fit, and the electrical connection between the terminals 220, 221, 222 is created by solder. The central terminals 220 provide the center tap of the secondary windings 202, while left and right terminals 221, 222 are connected to the ends of the secondary windings 202. The transformer 204 can include an integrated output inductor 226.

The output-rectifier PCB 210 can include pads that are used to connect the output-rectifier PCB 210 to the transformer 204. The terminals 220, 221, 222 and the output bus bar 225 can be soldered to corresponding pads on the output-rectifier PCB 210. A host PCB can include the primary-side circuit that can be connected to the primary windings 201 through terminals 223.

The primary windings 201 are connected in series by terminals 223, and the secondary windings 202 are soldered onto the output-rectifier PCB 210. The interleaved primary windings 201 and secondary windings 202 eliminate passive layer losses, improving the efficiency of the transformer 204. A high-power-density package can be achieved by the stacked winding structure. However, the secondary winding 202 connection does not avoid unbalanced current distribution because of the proximity effect and does not incorporate synchronous rectifiers and filter capacitors. Both the AC resistance and the distance between the secondary windings and the synchronous rectifiers increase the termination losses, which is undesirable in a high-efficiency design, such as titanium-efficiency power supplies.

In U.S. Patent Application Publication No. 2007/0152795 A1, U.S. Pat. No. 7,705,705 B2, and U.S. Patent Application Publication No. 2009/0085702 A1, the transformer structure includes primary and secondary windings connected in parallel so that a desired output-power rating can be achieved. As shown in FIG. 4, the power converter includes transformer structure 100, multiple secondary-circuit units 110, and each secondary-circuit unit 110 includes a PCB 111 with a secondary winding 112. The PCB 111 includes an output rectifier circuit and a capacitive filter (not shown). Core 113 includes a top core portion 114 and a bottom core portion 115. The secondary-circuit units 110 are stacked on top of each other such that central legs of the top core portion 114 and the bottom core portion 115 can be inserted into holes in the PCB 111 and the secondary winding 112. The secondary-circuit units 110 are connected in parallel to the output load. Although this known transformer structure can achieve high efficiency, the total size of the transformer assembly is considerably large.

Both D. Huang, S. Ji, and F. C. Lee, "LLC resonant converter with matrix transformer," *IEEE Trans. Power Electron.*, vol. 29, no. 8, August 2014, pp. 4339-4347, and C. Fei, F. C. Lee, and Q. Li, "High-efficiency high-power-density 380V/12V DC/DC converter with a novel matrix transformer," *Proc. IEEE APEC* 2017, Mar. 26-30, 2017, pp. 2428-2435, propose designs of planar matrix transformers with magnetic flux cancellation, fewer cores, smaller cores, and smaller core losses. Compared with previously discussed known designs, the termination loss and the leakage inductance of these known designs are further reduced by including the (SRs) and the filter capacitors into the secondary winding. Four layer PCBs including both the primary (inner layers) and the secondary windings (top and bottom layers) are used, thus defining a planar matrix transformer.

FIGS. 5A-5C, 6A, and 6B show different design variants of known planar matrix transformers that share the same basic concept. Variant #1 is shown in FIGS. 5A-5C and includes two U-shaped cores CORE 1' and CORE 2' and one winding PCB. The structure of variant #1 is essentially two transformers connected in parallel at the secondary side and in series at the primary side. Therefore, at steady state, the two transformers can automatically share the input voltage and the output current. However, during transients, the voltage spikes on the drain-to-source of the SRs have different values due to parameter tolerances of the two transformer cores CORE 1' and CORE 2', including tolerances in the magnetizing inductance and the leakage inductance. FIG. 5A shows the primary-side winding pattern, including the two cores CORE 1' and CORE 3' and the primary winding PRI. FIG. 5B is a side view of the transformer winding arrangement of CORE 1' on a four-layer PCB with the inner two layers of the PCB including the primary winding PRI and with the top and bottom layers of the PCB respectively including secondary windings SEC1 and SEC2. FIG. 5B also shows the secondary windings SEC1 and SEC2 connected to the synchronous rectifiers SR1, SR2, SR3, SR4 and to the output capacitors CAP and shows a graphical representation of the magnetomotive force of the PCB layers. FIG. 5C shows a top view of a representative PCB 211 including an LLC converter using the matrix transformer structure shown in FIGS. 5A and 5B.

Variant #2 is shown in FIGS. 6A and 6B and addresses the problems caused by transients by using one integrated core with four legs or pillars. Core losses and core volume are reduced due to the magnetic flux cancellation. FIG. 6A shows the magnetic flux in each pillar is divided into separate paths through the top and bottom magnetic material sheets to other adjacent pillars in which the magnetic flux is in the opposite direction. Thus, in a four-pillar arrangement, the magnetic flux density $\Phi_B$ will be reduced by at least one-half. One of the drawbacks of the structure of variant #2 is that the secondary outputs are separated on the two sides of the PCB 311 so that the mechanical design for terminating the outputs is complex.

Although the efficiency and the power density has been improved compared to the known previously discussed designs, the PCB footprints of the planer matrix transformer of both variants #1 and #2 are big, and the large secondary current loop forms a long travelling path for the output current, which leads to large losses, especially for high-power applications.

FIG. 17 is a circuit diagram illustrating a high-frequency supply of the related art that provides an AC primary current to the driver power supply current transformer using a single cable. This design uses six DC-DC converters to achieve six separate DC voltage outputs. Known isolated DC-DC converters, including the high-frequency power supply of FIG. 17, are bulky and expensive because of the number of required devices, which decreases the power density and increases complexity of PCB design.

SUMMARY OF THE INVENTION

To overcome the problems described above, preferred embodiments of the present invention provide a transformer with one or more of the following features:
1) A core and winding structure that provides higher efficiency and/or increased power density.
2) A reduced number of cores to shrink the size and footprint of the transformer to avoid long travelling paths of the secondary output current, which decreases losses for high-power applications.
3) One core structure to improve transformer design by providing better magnetic flux coupling between the secondary windings to achieve improved performance of the high-frequency LLC resonant converter, such as voltage stress minimization on the drain-to-source of the SRs caused by voltage spikes during transients.
4) Gaps between winding PCBs are left open for airflow to provide improved heat dissipation of the heat generated from the SRs and the primary and secondary windings without a heat sink, which results in a smaller size.
5) A secondary winding that provides a single output or multiple isolated outputs.
6) A primary winding that is wound around adjacent legs of the core in in opposite directions.
7) A core and winding structure that can be used in a compact, cost-effective isolated DC-DC converter that provides gate driver signals to a matrix-type rectifier, with increased power density and simpler PCB design.

According to a preferred embodiment of the present invention, a transformer assembly includes a top core, a bottom core under the top core, a primary winding that is multi-layered and that extends around each of the top core and the bottom core, and a secondary winding that is multi-layered and that extends around each of the top core and the bottom core. The primary winding extends around the top core and the bottom core such that, when current flows in the primary winding, magnetic flux is canceled or substantially canceled in a region between the top core and the bottom core.

The transformer assembly can further include a top printed circuit board (PCB) and a bottom PCB, wherein the top PCB and the bottom PCB can include turns of the primary winding and turns of the secondary winding. The turns of the primary winding included in the top PCB can be connected in series, the turns of the primary winding included in the bottom PCB can be connected in series, the turns of the secondary winding included in the top PCB can be connected in parallel, and the turns of the secondary winding included in the bottom PCB can be connected in parallel. The transformer assembly can further include a power pin that connects the turns of the primary winding on the top PCB in series with the turns of the primary winding on the bottom PCB, wherein the turns of the primary winding on the top PCB can be connected in series by vias and the turns of the primary windings on the bottom PCB can be connected in series by vias. The turns of the secondary winding can be located on top and bottom surfaces of the top PCB and on top and bottom surfaces of the bottom PCB, and the turns of the primary winding can be located on middle surfaces between the top and bottom surfaces of the top PCB and on middle surfaces between the top and bottom surfaces of the bottom PCB. An electronic component of a rectifier circuit can be located on at least one of the top and bottom surfaces of the top PCB and the top and bottom surfaces of the bottom PCB. The top and bottom cores can define six legs that are arranged in a 2×3 array and that extend through holes in the top PCB and in the bottom PCB, wherein the primary winding can be wound around each of the six legs such that the primary winding can be wound around adjacent legs in the 2×3 array in opposite directions.

The transformer assembly can further include positive and negative bus bars connected to the secondary winding. The transformer assembly can further include a plate core located between the top and bottom cores. The transformer assembly can further include a shielding layer located between the primary and secondary windings. The secondary winding can provide isolated outputs or a single output. The top and bottom cores can define six legs that are arranged in a 2×3 array, wherein the primary winding can be wound around each of the six legs such that the primary winding can be wound around adjacent legs in the 2×3 array in opposite directions.

According to a preferred embodiment of the present invention, a converter assembly includes the transformer assembly of various other preferred embodiments of the present invention, a primary-side circuit including the primary windings, and a secondary-side circuit including the secondary windings.

The primary-side circuit preferably includes a first primary-side switch and a second primary-side switch connected to an input voltage. The primary-side circuit preferably includes a capacitor and an inductor connected between the first primary-side switch and the second primary-side switch and the transformer assembly. The secondary-side circuit preferably includes synchronous rectifiers.

According to a preferred embodiment of the present invention, a converter assembly includes a first printed circuit board (PCB) that includes a first core and two holes; a second PCB that includes a second core and two holes; two legs that connect the first core and the second core and that extend through the two holes in the first PCB and the two holes in the second PCB; a primary winding that is located on and/or in the first and second PCBs such that, when current flows in the primary winding, magnetic flux from the first core cancels or substantially cancels magnetic flux from the second core in a region between the first and second PCBs; and a secondary winding that is located on and/or in the first and second PCBs.

The converter assembly further preferably includes a plate core located between the first and second cores in which there is no or almost no magnetic flux. The converter assembly further preferably includes a rectifier circuit, wherein at least one electronic component of the rectifier circuit is located on the first PCB or the second PCB. Turns of the primary winding are preferably connected in series, and turns of the secondary winding are preferably connected in parallel.

The converter assembly further preferably includes a primary circuit including the primary winding and a secondary circuit including the secondary winding, wherein the primary circuit includes first and second switches. The primary circuit preferably includes a resonant circuit connected to the first and second switches.

The converter assembly further preferably includes first and second bus bars connected to the secondary winding.

According to a preferred embodiment of the present invention, a transformer assembly including a core including top and bottom plates connected by six legs arranged in a 2×3 array, a primary winding wound around each of the six legs such that the primary winding is wound around adjacent legs in the 2×3 array in opposite directions, and a secondary winding wound around each of the six legs such that the secondary winding provides six isolated outputs. When current flows in the primary winding, magnetic flux in the top and bottom plates is a portion of the magnetic flux in each of the six legs.

According to preferred embodiment of the present invention, a converter assembly includes the transformer assembly of various other preferred embodiments of the present invention, and a first printed circuit board (PCB) that includes six holes through which the six legs of the core extend. The primary and the secondary windings are located on and/or in the first PCB.

The converter assembly can further includes a second PCB that includes six holes through which the six legs of the core extend, wherein the primary and the secondary windings can be located on and/or in the second PCB and the secondary winding can provide six additional isolated outputs. The converter assembly can further include a plate core located between the top and bottom plates.

According to a preferred embodiment of the present invention, a converter assembly including a first printed circuit board (PCB) that includes a first core and holes; a second PCB that includes a second core and holes; a plurality of legs that connect the first and the second cores and that extend through corresponding holes in the first PCB and corresponding holes in the second PCB; a primary winding that is located on and/or in the first and second PCBs such that, when current flows in the primary winding, magnetic flux from the first core cancels or substantially cancels magnetic flux from the second core in a region between the first and second PCBs; a secondary winding that is located on and/or in the first and the second PCBs; a primary side circuit that converts an input voltage to a first voltage and connected to the primary winding; a secondary side circuit that rectifies an output from the secondary winding; and a plurality of output terminals on at least one of the first and the second PCBs that output a corresponding plurality of output voltages.

The converter assembly can further include a plate core located between the first and the second cores in which there is no or almost no magnetic flux. The plurality of output voltages can all be of the same value. The input voltage can include a plurality of input voltages. The input voltage can be an alternating-current (AC) voltage.

The above and other features, elements, steps, configurations, characteristics and advantages of the present invention will become more apparent from the following detailed description of preferred embodiments of the present invention with reference to the attached drawings.

BRIEF DESCRIPTION OF THE DRAWINGS

FIGS. 2-4, 5A, 5B, 5C, 6A and 6B show known transformers.

FIGS. 7A-7H show a development process of a transformer according to a preferred embodiment of the present invention.

FIG. 19 shows a transformer with one core set for a 2-channel isolated DC-DC power supply.

FIG. 20 shows three transformers with three separate core sets that can be used in a 6-channel isolated DC-DC power supply.

FIG. 21A shows three integrated cores without magnetic flux cancellation.

FIG. 21B shows three integrated cores with magnetic flux cancellation.

DETAILED DESCRIPTION OF PREFERRED EMBODIMENTS

Figure 1:
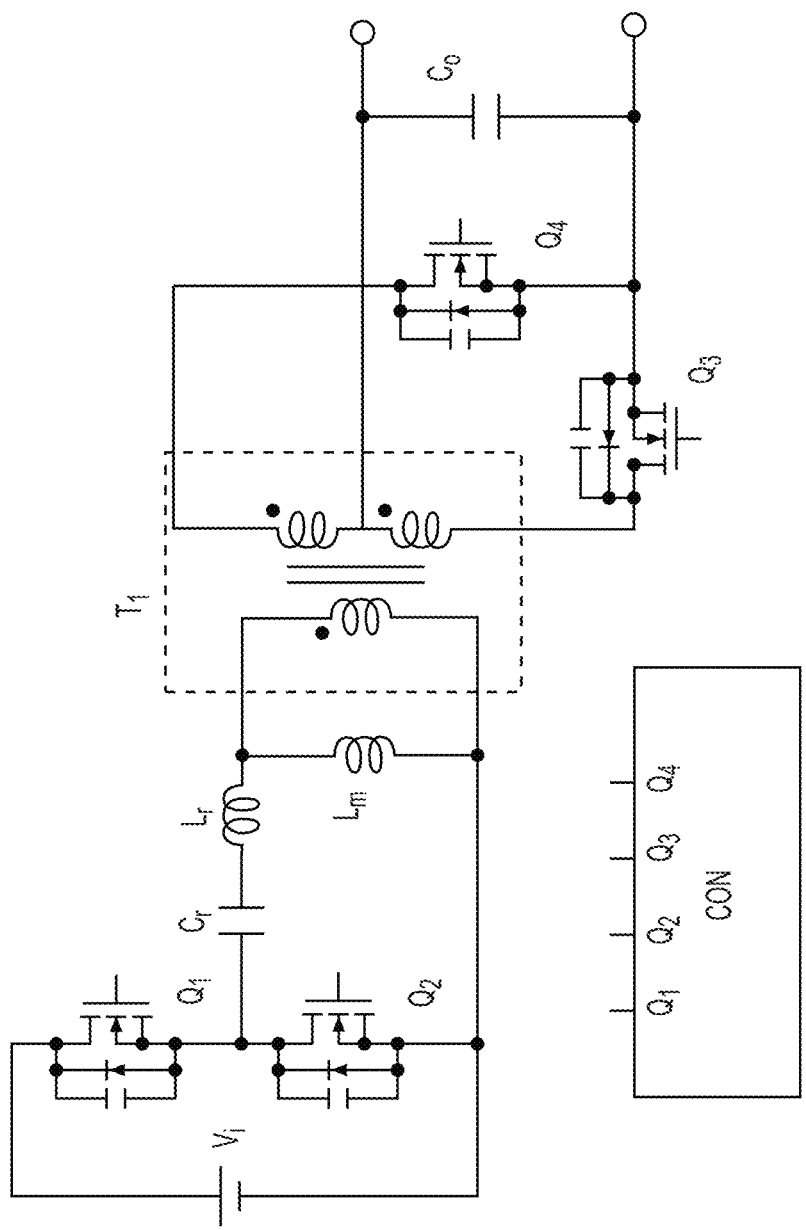
FIG. 1 is a circuit diagram of a half-bridge LLC resonant converter.
Figure 2:
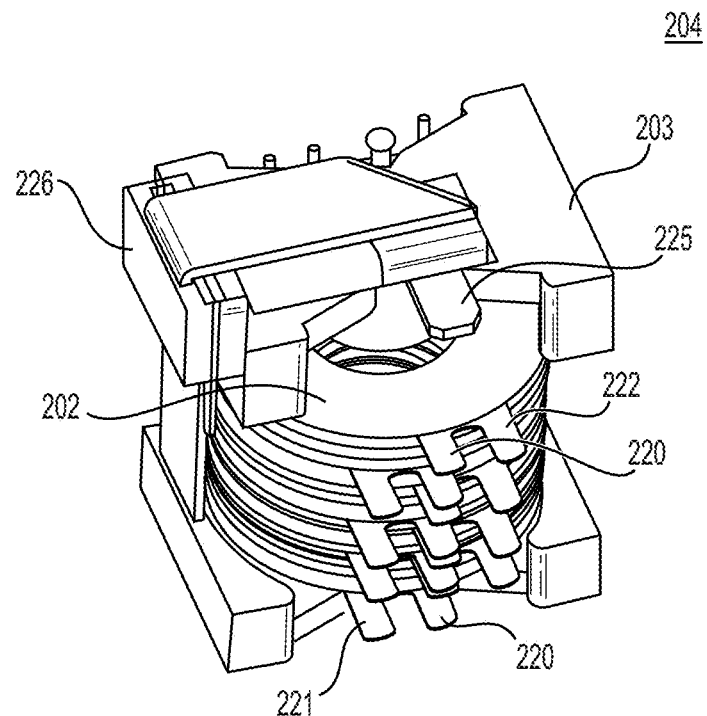
Figure 3:
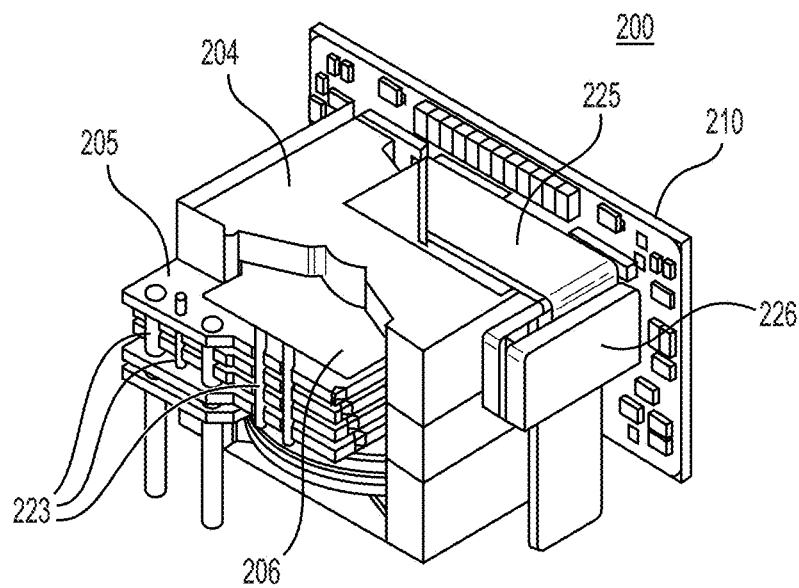
Figure 4:
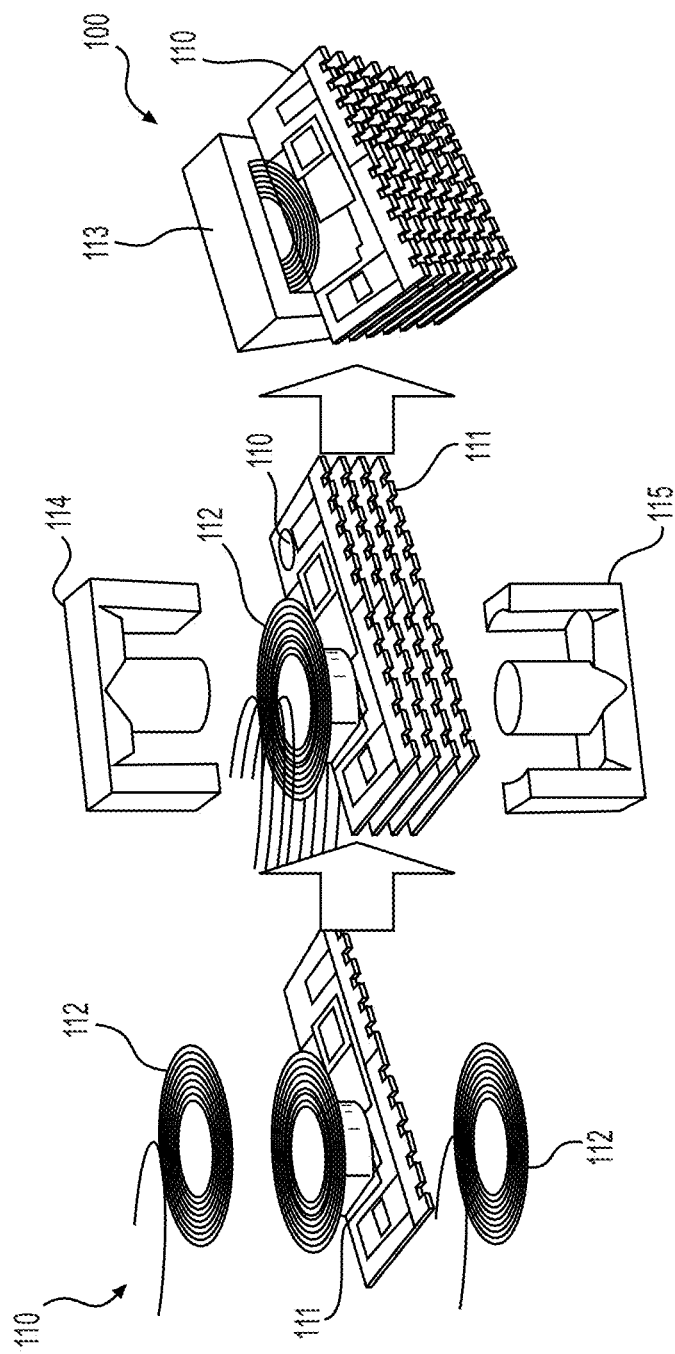
Figure 5A:
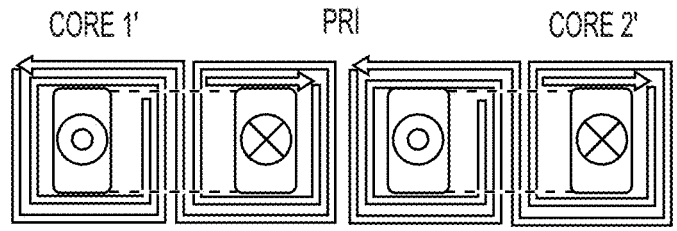
Figure 5B:
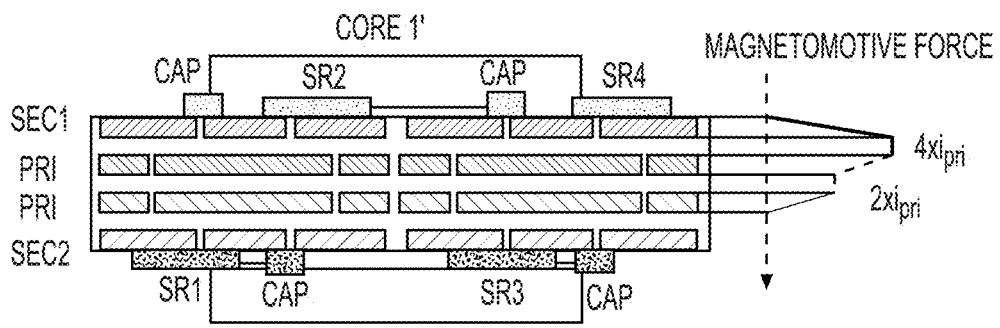
Figure 5C:
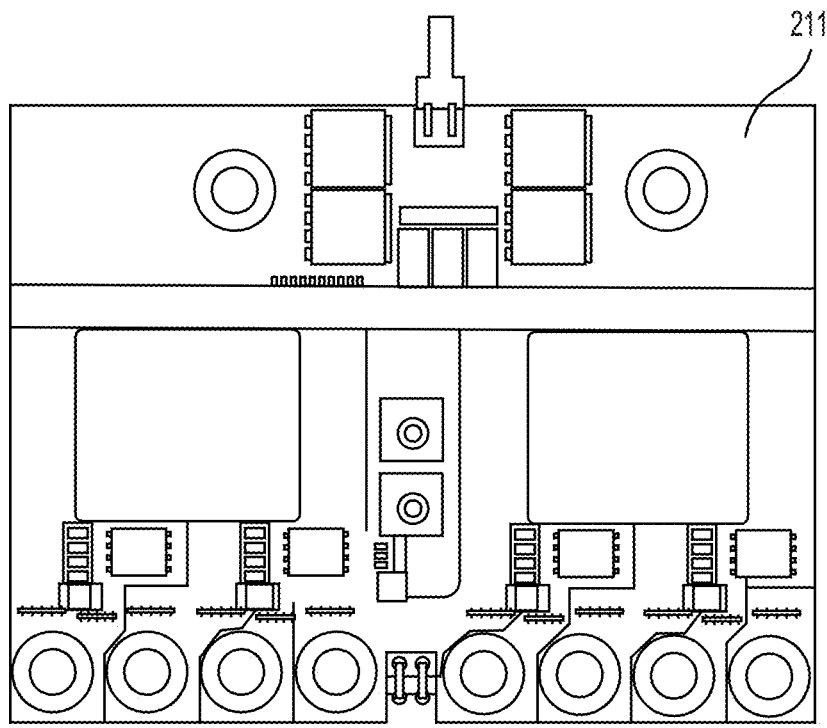

Preferred embodiments of the present invention relate to stacked matrix transformers that can be used in DC/DC resonant converters, in particular high-frequency LLC converters. FIG. 1 illustrates a typical application of such a stacked matrix transformer in a half-bridge LLC converter. For high-output current applications, like a server, synchronous rectifiers (SRs) shown as switches $Q_3$ and $Q_4$ in FIG. 1 are required to be connected in parallel to reduce device conduction losses, whereas the stacked matrix transformer is a better candidate than the conventional planer matrix transformer for winding loss minimization. Integrating the SRs and the output filter capacitor(s) $C_o$ (output capacitor $C_o$ in FIG. 1 could include multiple capacitors) into the transformer secondary windings decreases the termination losses. The stacked structure reduces or minimizes the length of the secondary current loop, which decreases the losses, in particular for high-power applications, and which decreases the secondary leakage inductance, reducing the voltage stress on the SRs.

The development process of magnetic integration by magnetic flux cancellation of the vertically stacked transformer is shown in FIGS. 7A-7H. Four U-I cores CORE 1, CORE 2, CORE 3, CORE 4 in the original matrix transformer can be reduced to two U-I core sets CORE 1', CORE 2' by rearranging the primary-side winding pattern PRIx and magnetic flux cancellation, as seen in FIGS. 7A-7D. The core loss and core size are reduced by more than 30% based on the following publication: D. Huang, S. Ji, and F. C. Lee, "LLC resonant converter with matrix transformer," IEEE Trans. Power Electron., vol. 29, no. 8, August 2014, pp. 4339-4347. FIG. 7E shows a side view of the structure of the planar matrix transformer in FIG. 7D. Both the primary windings and the secondary windings are included in one PCB 7E10. If the PCB 7E10 is cut in the middle, a vertically stacked transformer can be generated by putting one core set with a separate PCB 7F10 on top of the other PCB 7F20 as shown in FIG. 7F. The magnetic fluxes produced by the top winding set and the bottom winding set cancel each other out in the middle of the two winding sets so that the middle cores can be shrunk to an I-shaped plate as shown FIG. 7G to further reduce the core volume and losses. A minimum distance can be kept between the two PCBs 7G10 and 7G20 to avoid any mechanical interference between the bottom components of the top PCB 7G10 and the top components of the bottom PCB 7G20. Since there is no magnetic flux in the middle core, this stacked transformer can be further simplified by completely removing the middle I-shaped plate core and extending the legs as shown in FIG. 7H. The resultant transformer only contains two U-shaped cores, and the manufacturing cost can be decreased as well. Moreover, better airflow can be achieved to help dissipate the heat generated by the SRs and the windings.

In an example of a 12 V-output half-bridge LLC converter with a 400 V input DC bus, the turns ratio of the high frequency transformer can be set at 16:1. Using structure variation and magnetic flux cancellation as shown in FIGS. 7A-7D and as discussed above, the number of cores can be decreased to two, and the center legs of the variant E cores in FIG. 7C can be removed because no magnetic flux flows through them. In the stacked matrix transformers shown in FIGS. 7G and 7H, each PCB includes primary windings on the inner layers of the PCB, similar to the arrangement shown in FIG. 11.

FIG. 7E shows a front view of the transformer structure shown in FIG. 7D with two cores attached to one winding PCB 7E10. This horizontally spaced structure can be changed to a vertically stacked structure by separating the one winding PCB 7E10 into two winding sets and stacking the two winding sets as shown in FIG. 7F. As shown in FIG. 7F, the magnetic fluxes generated by the top winding set and by the bottom winding set cancel each other out in the middle portion between the two winding sets. Therefore, the core in the middle can be shrunk to a plate core as shown in FIG. 7G. Alternatively, because no magnetic flux flows through this plate core, this plate core can be removed as shown in FIG. 7H.

Figure 8:
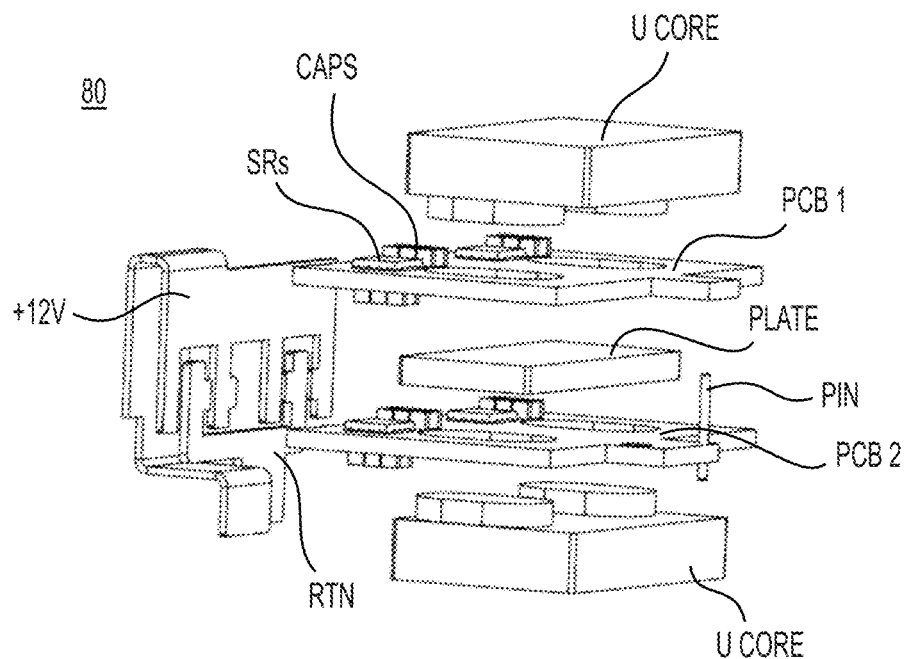
FIGS. 8-10 is an exploded view and side views of a transformer assembly according to a preferred embodiment of the present invention.
Figure 9:
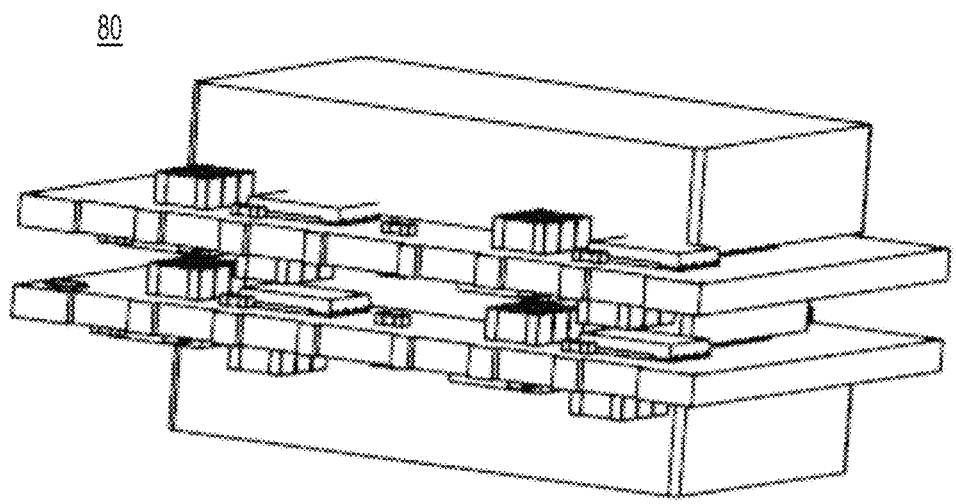
Figure 10:
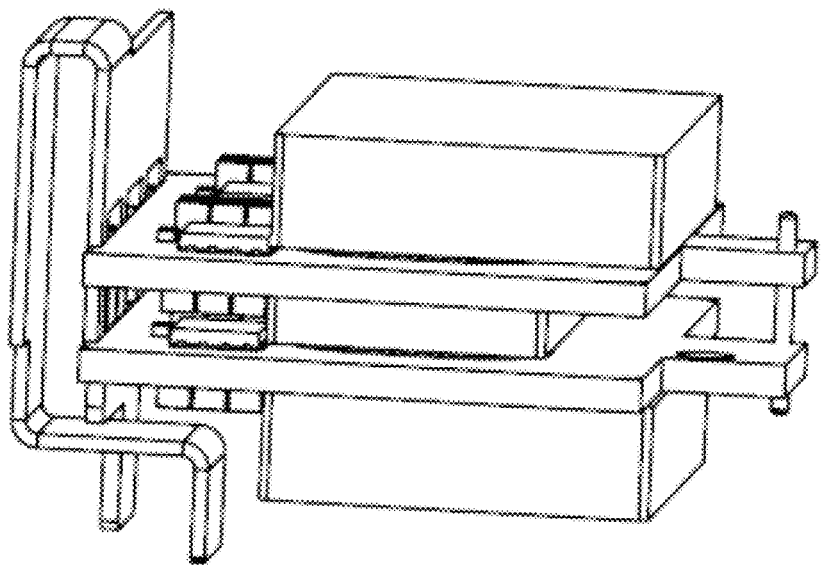

FIGS. 8-10 show an exemplary stacked matrix transformer 80. To improve the power density and reduce the loss of the stacked transformer, the stacked matrix transformer's two cores are vertically stacked. As shown in FIG. 8, two winding PCB 1 and PCB 2 are stacked between a split top and bottom U-shaped core U CORE, and separated by a plate core PLATE. Winding PCBs 1, 2 are oriented as close as possible to each other with no mechanical interference between the bottom components of the top winding PCB 1 and the top components of the bottom winding PCB 2, which can include eight SRs and filter capacitors CAPS. Winding PCBs 1, 2 are connected to the main board by a +12 V bus bar and a return bus bar RTN. The primary windings of windings PCB 1, 2 are electrically connected to each other by a power pin PIN located in through holes on the winding PCBs 1, 2. FIGS. 9 and 10 are views of a completed assembly of the stacked transformer 80.

Compared with a conventional planer matrix transformer, the vertical stacked structure minimizes the distance of the secondary-current travelling path such that copper losses can be reduced. This reduction in the secondary-current travelling path results in improved efficiency.

For example, winding PCBs 1, 2 can include six layers with the top and bottom layers including the secondary winding, the SRs, and the filter capacitors CAPS to minimize the termination losses and with the four middle layers are the primary windings connected in series, with one turn per layer. Other arrangements of the primary and secondary windings are possible. For example, the primary windings can be located on the top and bottom layers, while the secondary windings can be located on the middle layers.

Figure 11:
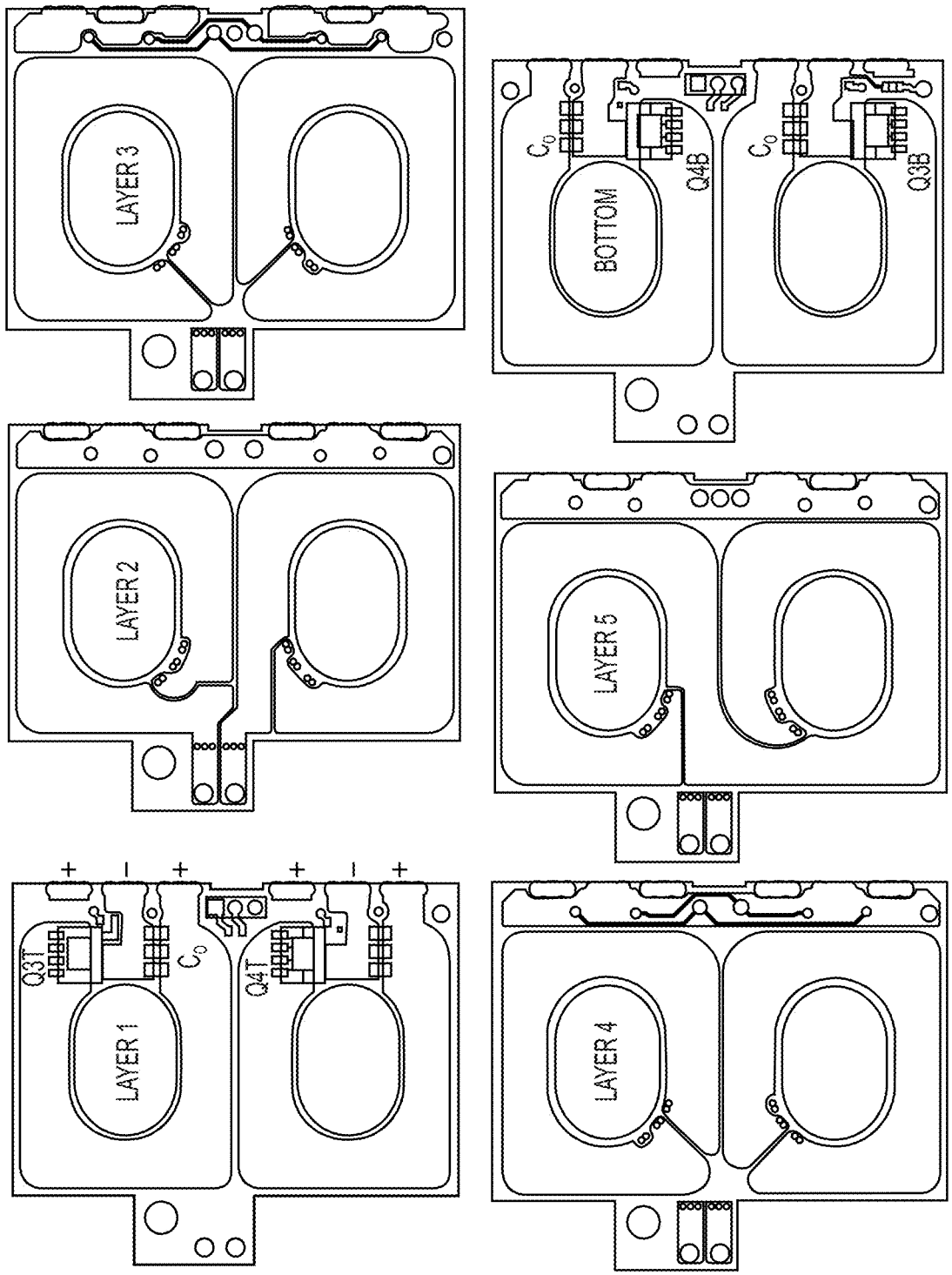
FIG. 11 shows a representative layout of the layers of one of the winding PCBs according to a preferred embodiment of the present invention.
Figure 12:
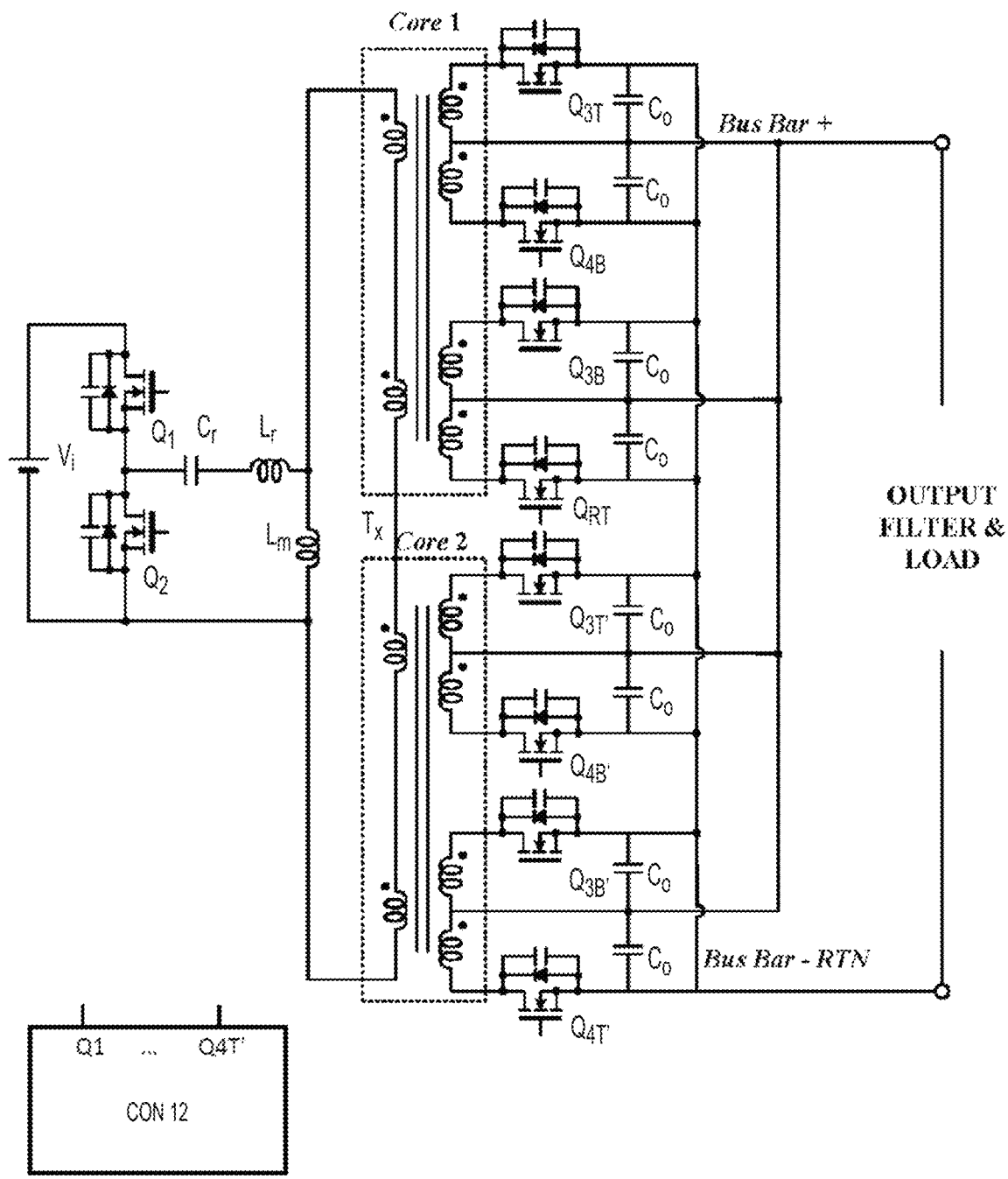
FIG. 12 is a diagram of an LLC circuit with a stacked transformer according to a preferred embodiment of the present invention.

FIG. 11 shows an exemplary layout of each of the six layers, including the bottom layer BOTTOM, and layers 1-5 of the winding PCBs 1, 2. The layout for both winding PCBs 1, 2 can be the same or can be different. In FIG. 11, the plus sign '+' indicates a positive output terminal, and the minus sign '−' indicates a negative output terminal. The primary windings on each of the winding PCBs 1, 2 are connected in series by embedded vias. The primary windings in the two winding PCBs 1, 2 are also connected in series by power pin PIN (as shown in FIG. 8). The secondary windings and the SRs are connected in parallel at the DC output terminals by the +12 V bus bar and the return bus bar RTN, as shown in FIG. 12. The +12 V bus bar and the return bus bar RTN can be used to attach the stacked matrix transformer to a substrate (not shown), such as a PCB. For example, legs of the +12 V bus bar and the return bus bar RTN can be inserted into corresponding holes in the substrate and then soldered to create mechanical and electrical connections between the stacked matrix transformer and the substrate. One or more electronic components of a rectifier circuit, including the SRs and the output capacitors $C_o$, can be located in the top and bottom surfaces of the winding PCBs 1, 2.

FIG. 12 shows an exemplary LLC circuit diagram of a half-bridge DC-DC converter using an LLC series resonant circuit with a stacked transformer. As shown in FIG. 12, the passive components of the capacitor $C_r$, inductor $L_r$, and inductor $L_m$ define a resonant circuit and are connected to the primary side of the stacked matrix transformer TX, and the active components of the switches $Q_1$ and $Q_2$ are connected to the primary side of the transformer TX and to input voltage $V_i$.

FIG. 12 also shows a circuit representation of the stacked transformer TX that includes two cores Core 1 and Core 2 in parallel, in which each core is associated with two primary windings and four secondary windings. The switches $Q_{3T}$, $Q_{4B}$, $Q_{3B}$, $Q_{4T}$, $Q_{3T}'$, $Q_{4B}'$, $Q_{3B}'$, and $Q_{4T}'$ are included in a rectifier circuit and are connected in parallel on the secondary side of the transformer TX as synchronous rectifiers (SRs). Output capacitors $C_o$ are connected to the secondary side of the transformer TX. As shown in FIG. 11, one or more electronic components of the rectifier circuit, including the SRs and the output capacitors $C_o$, can be located on the top layer LAYER 1 and the bottom layer BOTTOM of the winding PCBs. Center taps of the secondary winding are connected together at the "+" bus bar, and the drains of the switches $Q_{3T}$, $Q_{4B}$, $Q_{3B}$, $Q_{4T}$, $Q_{3T}'$, $Q_{4B}'$, $Q_{3B}'$, and $Q_{4T}'$ are connected together at the "−" bus bar. Switching of all of the transistors can be operated by the controller CON 12.

A shielding layer (not shown) can be included between the primary and the secondary windings and connected to the primary grounding to improve electromagnetic inference (EMI) performance.

Figure 13:
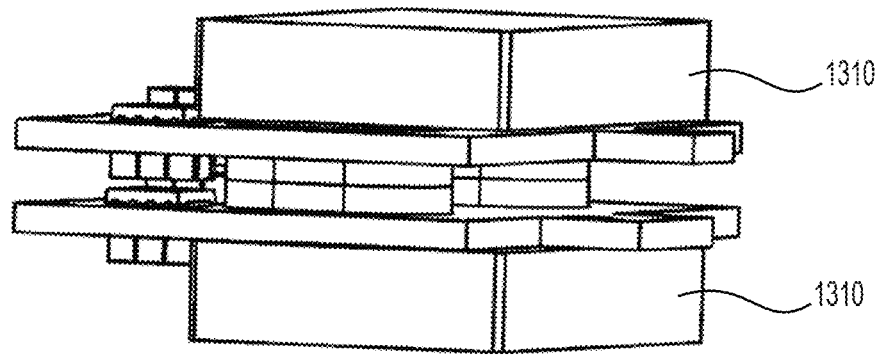
FIG. 13 shows a transformer according to a preferred embodiment of the present invention.

As shown in FIG. 8, a plate core can be used to divide the two winding PCBs 1, 2. As seen from the magnetic flux distribution analysis in FIG. 7, the magnetic fluxes generated by the top winding set and the bottom winding set cancel each other out in the plate core. Therefore, the core loss can be reduced compared with the conventional matrix transformer of FIG. 6. Because no magnetic flux flows through the plate core, the plate core can be removed as shown in FIG. 13. As shown in FIG. 13, the transformer 130 can include only a two-piece core 1310, saving core material and cost. Moreover, much better airflow can be achieved in this configuration to help remove the heat from the transformer. Not including the middle plate may increase the secondary leakage inductance that can result in a slightly higher voltage spike on the drain-to-source of the SRs. However, the voltage spike of the SRs on the two different winding PCBs 1, 2 is uniform because the two winding PCBs 1, 2 are inside the same transformer core set. In contrast, the transformer with the plate core as shown in FIG. 8, the two winding PCBs 1, 2 belong to two different transformer core sets, where some of the SRs may exhibit higher voltage spike due to the tolerance of the two core sets, especially during transients.

The primary and secondary windings do not have to be in series and parallel, respectively, as described above. Any series/parallel configuration could be used and depends on the input and output voltage/current ratings and transformer configuration. Also, variants in the core structure, such as the shape or more stacks with more winding sets, can be used. The vertically stacked windings sets discussed above can be used in high-efficiency matrix transformers with high power density and can be used in high-frequency LLC converter design. For example, three or four winding PCBs can be vertically stacked in the same way as described above, further increasing the power capacity of the transformer.

Figure 14:
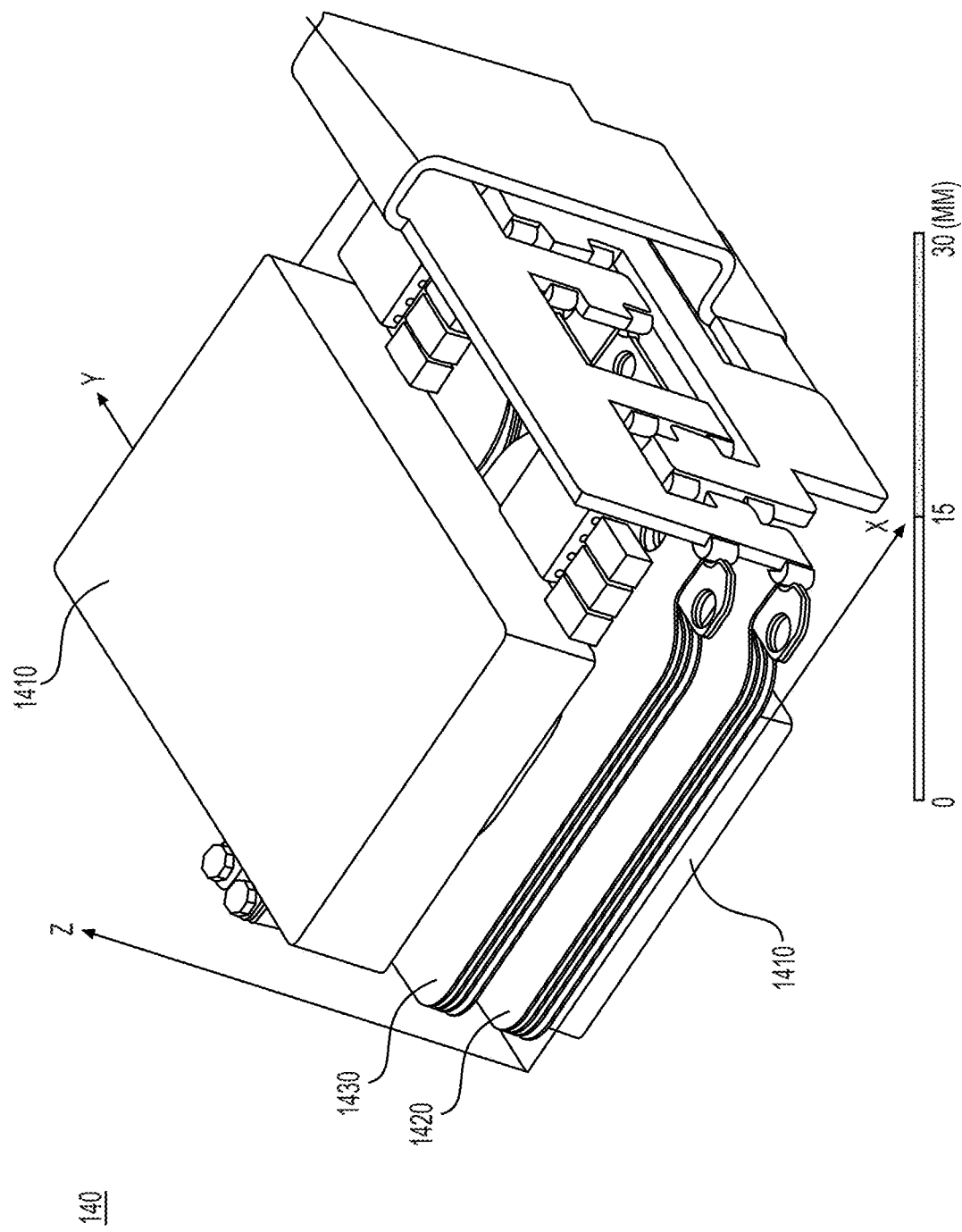
FIG. 14 shows a model of the transformer shown in FIG. 10.
Figure 15:
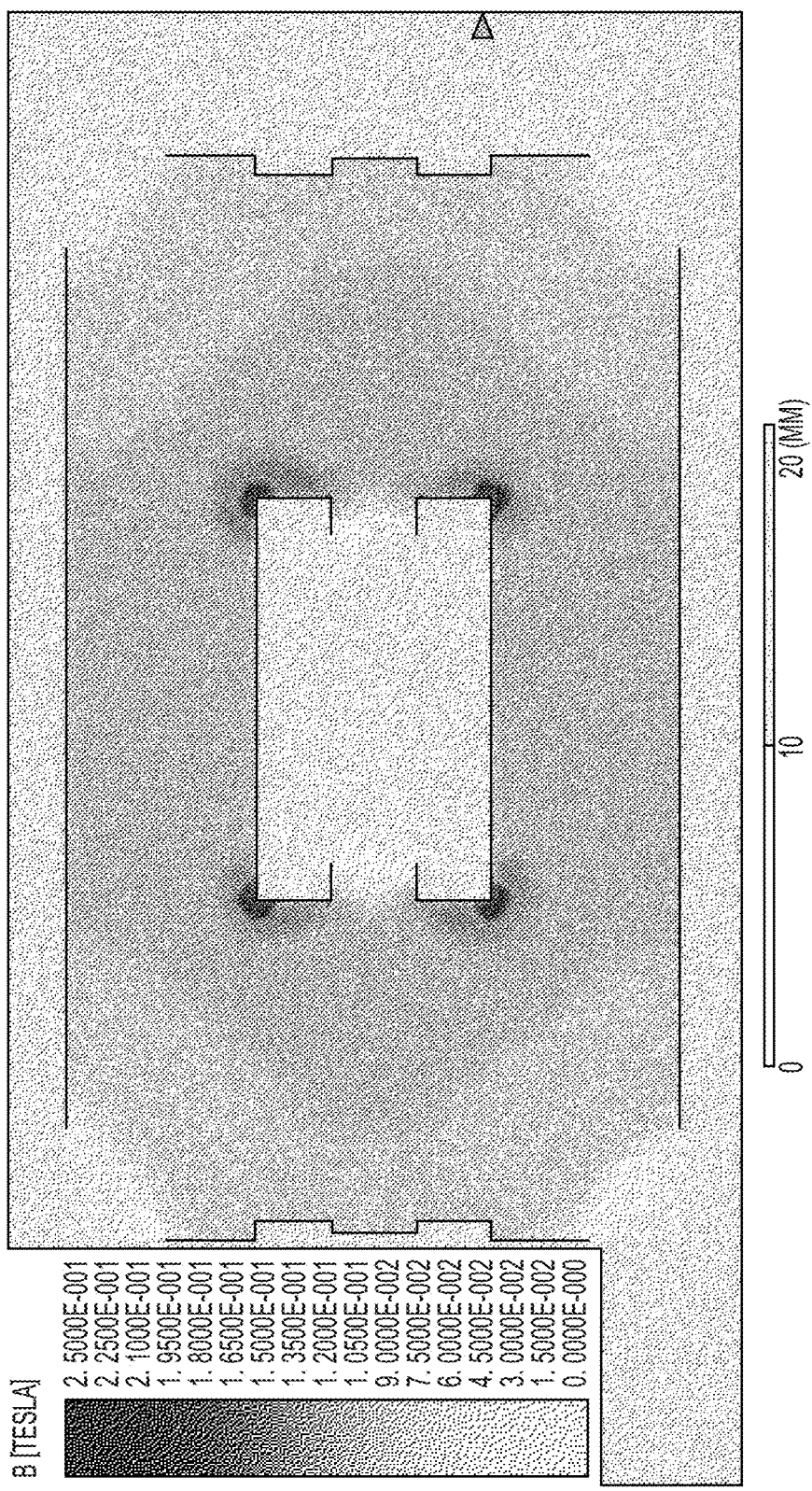
FIG. 15 is a magnetic flux density model of the transformer shown in FIG. 10.

FIG. 14 shows an Ansys simulation of a model of the stacked transformer 140 shown in FIG. 7 that includes a middle-plate (not visible) and an I-shaped core 1410 between the two winding PCBs 1420 and 1430. A simulation of the core magnetic flux density of the stacked transformer shown in FIG. 8 is shown in FIG. 15. FIG. 15 shows that the magnetic flux density B in the middle-plate and I-shaped core structure is zero due to the magnetic flux cancellation. Thus, this middle-plate can be removed, and the legs can be extended accordingly.

Figure 16:
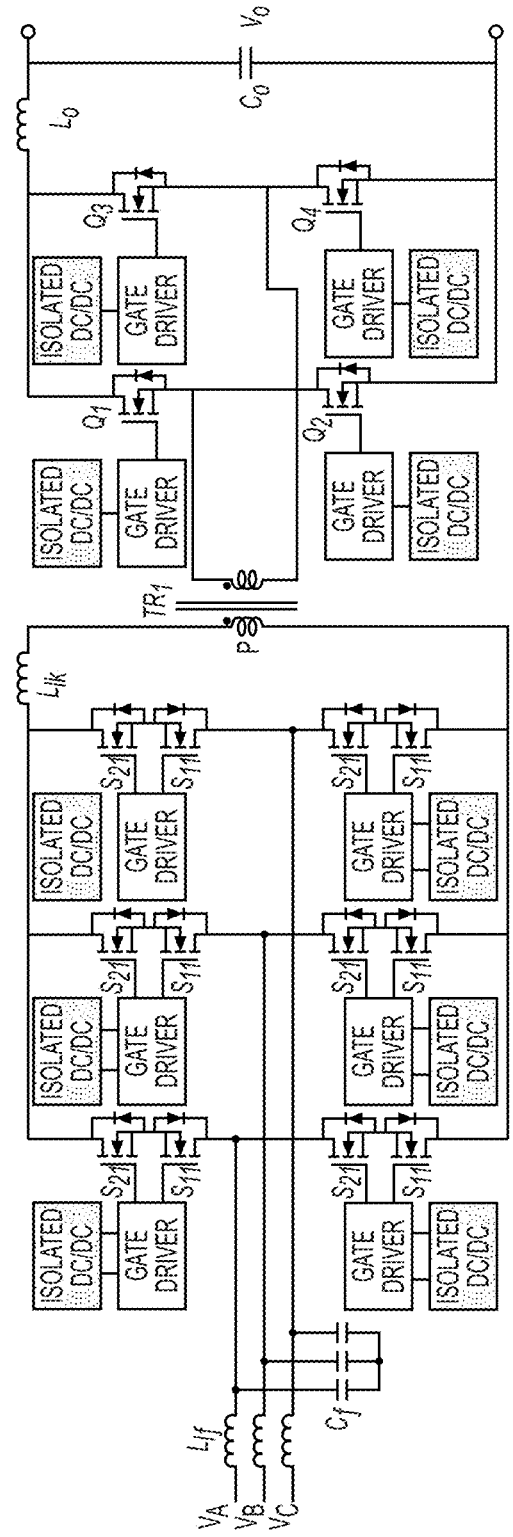
FIG. 16 is a circuit diagram of a matrix-type rectifier with isolated DC-DC converters as gate drivers.

FIG. 16 is a circuit diagram of a matrix-type rectifier with isolated DC-DC converters as gate drivers. The isolated DC-DC converters shown in FIG. 16 can be provided by either the high-frequency power supply of FIG. 17 or the isolated power supplies of FIGS. 18A and 18B.

Figures 18A, 18B:
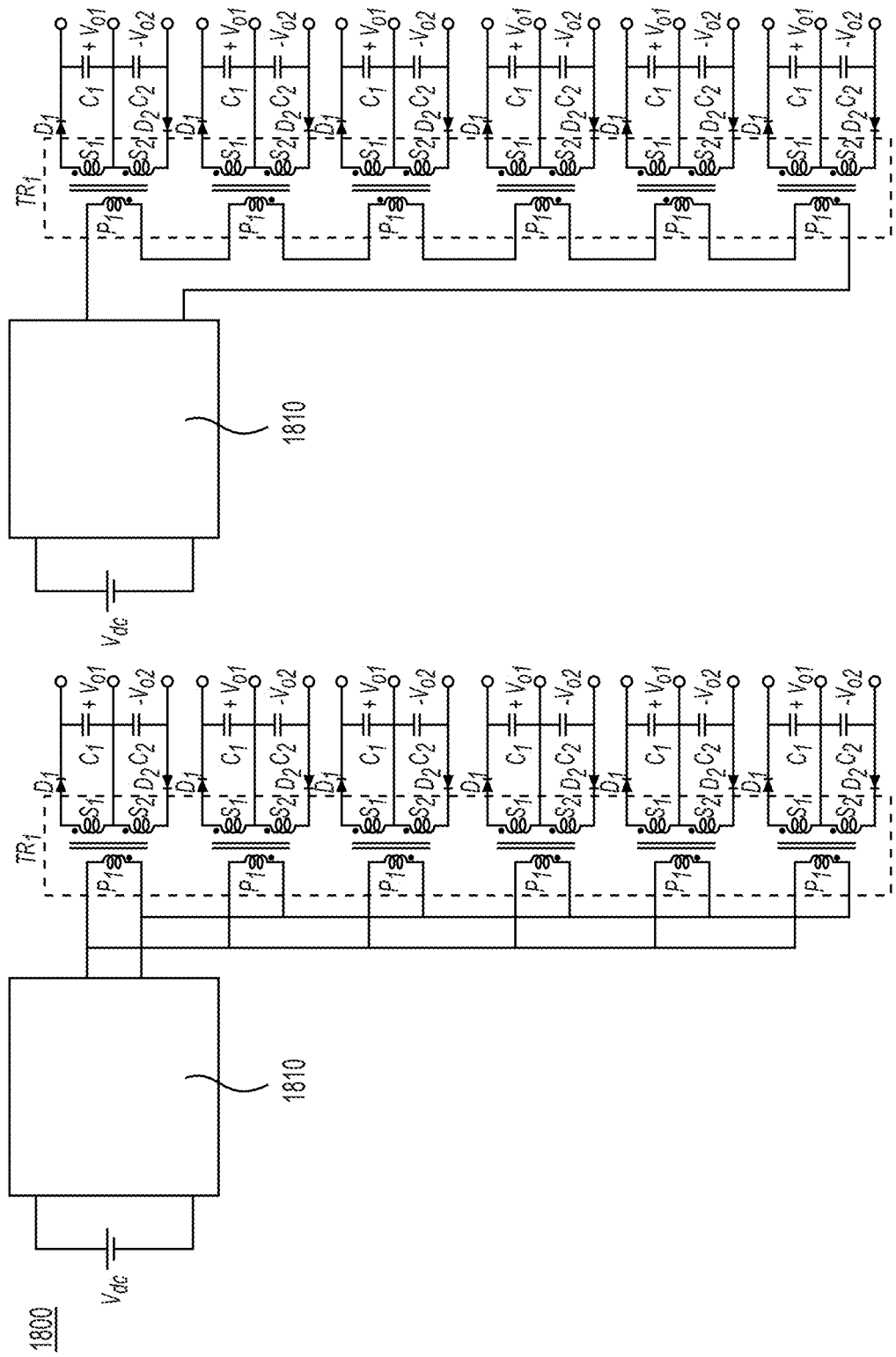
FIGS. 18A and 18B are circuit diagrams of isolated power supplies according to preferred embodiments of the present invention.

FIGS. 18A and 18B are circuit diagrams of isolated power supplies 1800, 1850 for a gate driver of a SiC MOSFET or integrated-gate bipolar transistor (IGBT). In FIG. 18A, the primary windings P1 of the isolated power supply 1800 are connected in parallel, and in FIG. 18B, the primary windings P1 of the isolated power supply 1850 are connected in series. The secondary windings S1, S2 in a single pair of secondary windings can be connected together or center tapped, with the pairs of secondary windings not connected to each other, to provide two channels of isolated output. As will be further discussed below, the power supplies 1800, 180 can include an integrated matrix transformer $TR_1$ with one input voltage $V_{dc}$, primary side conversion circuitry 1810, 1860, secondary side rectification circuitry that provide 12 parallel outputs in one module, where each output can be a regulated or non-regulated DC output $V_{ox}$ that can be applied to the gate with a 1.5-kV-to-5-kV voltage isolation. These power supplies 1800, 1850 can power multiple loads where a few kV isolation is required. The number and locations of the outputs of the power supplies 1800, 1850 can be changed to meet the requirements of the loads. As shown in FIGS. 18A and 18B, the rectification circuitry can include diodes D1, D2. Alternatively, the rectification circuitry can include synchronous rectifiers.

Figure 17:
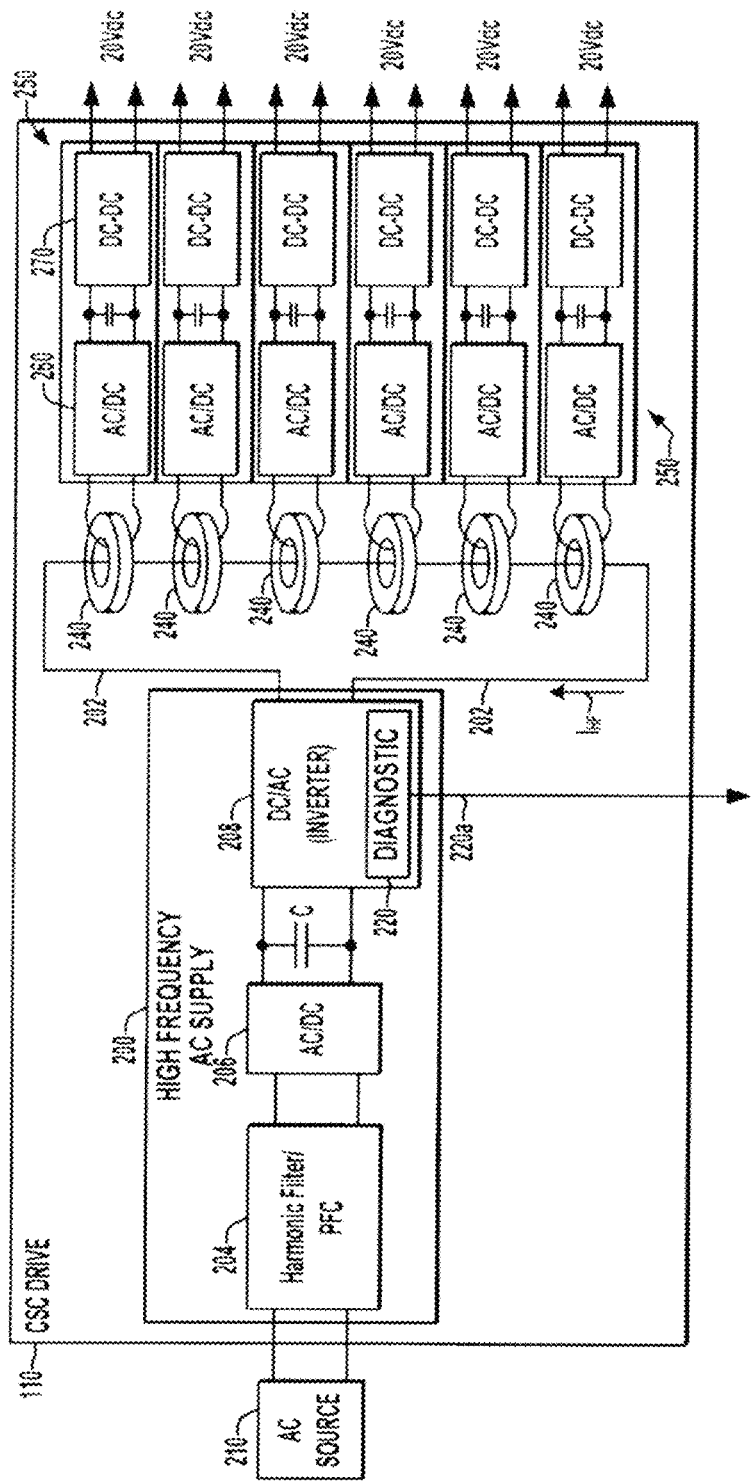
FIG. 17 is a circuit diagram of a high-frequency power supply providing AC primary current to the driver power supply current transformer of the related art.

With the increase of voltage level and number of power semiconductors in electronic equipment, the power supplies 1800, 1850 as shown in FIGS. 18A and 18B will be more advantageous compared to a power supply shown in FIG. 17 having the same capacity, the same number of outputs, and the same isolation voltage. The power supplies 1800, 1850 shown in FIGS. 18A and 18B can provide the advantages of smaller size, lighter weight, higher efficiency, higher reliability, and lower cost.

The power supplies 1800, 1850 shown in FIGS. 18A and 18B can include a stacked matrix transformer. With magnetic flux cancellation, two separate transformers can be integrated into a single integrated transformer with one core set COREX with two legs as shown in FIG. 19, which is similar to the arrangement shown in FIG. 7D. The core set COREX can define a complete magnetic loop by including two legs or pillars, shown as the circles in FIG. 19, that are located between two plates, of which the top plate is shown as the rectangle in FIG. 19 and of which the bottom plate is not shown but is below the top plate. The circled dot in the left leg indicates that the magnetic flux is directed into the page of FIG. 19, and the circled X in the right leg indicates that the magnetic flux is directed out of the page of FIG. 19. The arrow of the magnetic flux 0 shows the direction of the magnetic flux 0 in the top plate is from the left leg to the right leg. Each leg together with its corresponding primary winding, indicated by the spiral-shaped arrows in FIG. 19, forms a single transformer that can be used to provide one channel of the isolated DC-DC power supply, which is similar to the arrangement shown in FIG. 7D. With two legs, this transformer structure can provide two channels of an isolated gate driver power supply. When six channels are required, which is a common case for a three-phase converter design, three transformers each including a separate core CORE1, CORE2, and CORE3 can be used as shown in FIG. 20.

The three separate core sets CORE1, CORE2, and CORE3 with legs arranged in 2×3 array as shown in FIG. 20 can be merged into a single core set COREY and COREZ with legs arranged in a 2×3 array as shown in FIGS. 21A and 21B, so that the transformer assembly can be significantly simplified by including only one core set COREY or COREZ and one winding PCB. In FIG. 21A, the magnetic flux pattern and core losses are the same as the three separate core sets COREL, CORE2, CORE3 shown FIG. 20. By rotating the second core set Core2 of FIG. 20 by 180° as shown in FIG. 21B, magnetic flux cancellation can be achieved so that the total magnetic flux density inside the top and bottom plates can be much smaller. In other words, the primary windings of nearest adjacent legs are wound in opposite directions. In FIG. 21A, the primary windings on the left legs are wound counterclockwise, and the primary windings on the right legs are wound clockwise. In contrast, in FIG. 21B, the top and bottom left legs and the middle right leg are wound counterclockwise, and the primary windings on the middle left leg and the top and bottom right legs are wound clockwise. The winding directions in FIGS. 21A and 21B are only examples, and other winding arrangements are possible. Although the magnetic flux within each leg is the same as the magnetic flux in each leg shown in FIG. 21A, the total magnetic flux $\Phi 1$, $\Phi 2$, and $\Phi 3$ inside the top and bottom plates is only a portion of the magnetic flux $\Phi$ in the legs. Therefore, the thickness of the top and bottom plates can be reduced to maintain the same magnetic flux density, while decreasing core losses due to a smaller core volume.

Figure 22:
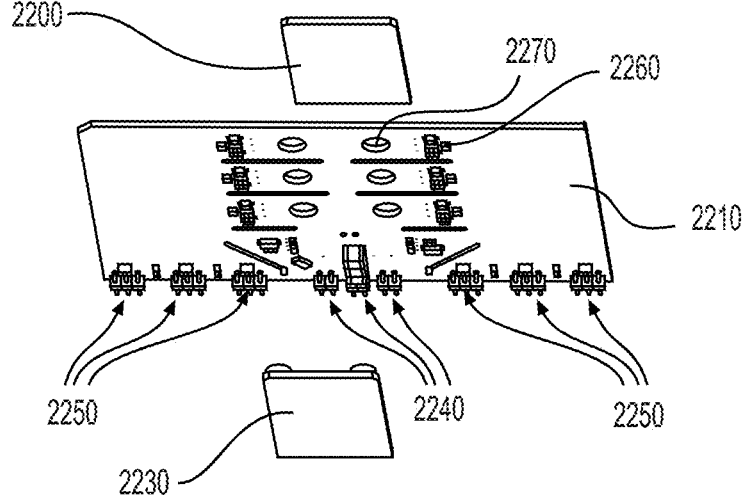
FIG. 22 shows an isolated DC-DC converter with a matrix-core transformer and multiple outputs.
Figure 23:
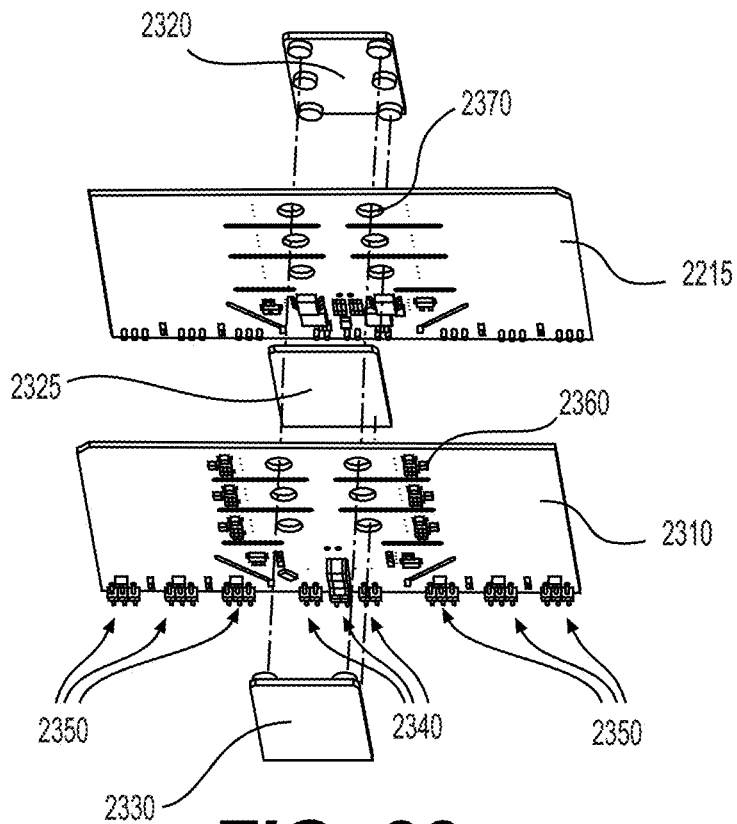
FIG. 23 shows an isolated DC-DC converter with a stacked matrix-core transformer and multiple outputs.
Figure 24:
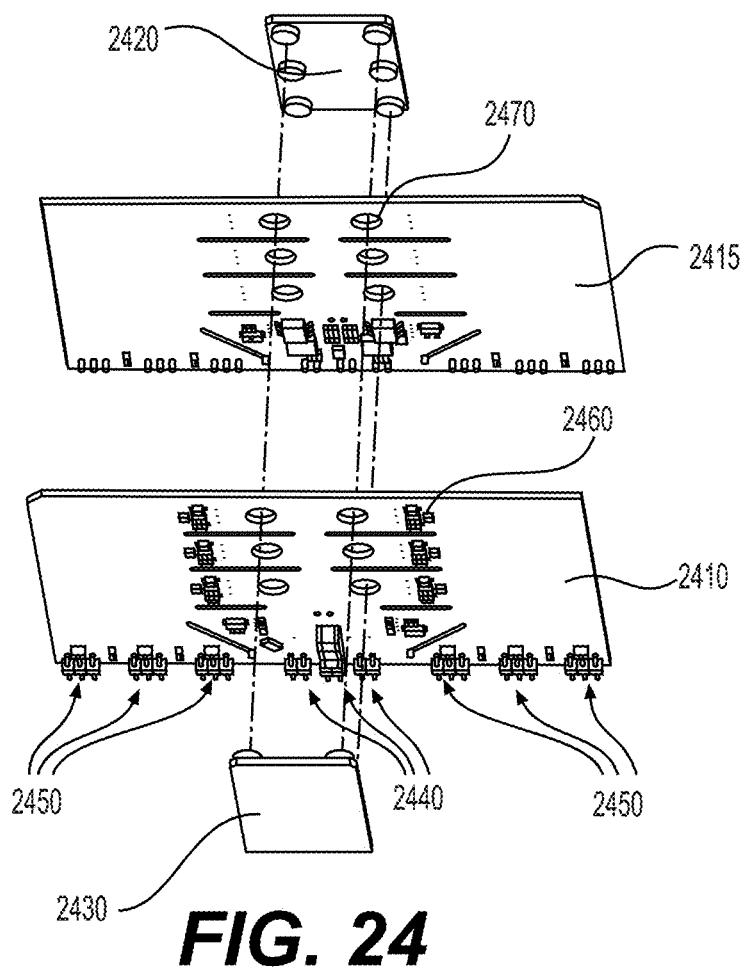
FIG. 24 shows an isolated DC-DC converter with a stacked matrix transformer and multiple outputs.

FIGS. 22-24 show the structure and assembly of three isolated DC-DC converters with multiple outputs. FIG. 22 shows an isolated DC-DC converter 2200 with a PCB 2210, a first plate 2220, and a second plate 2230. The PCB 2210 includes three input terminals 2240, six isolated outputs at terminals 2250, and circuit components 2260. If the isolated DC-DC converter 2200 is a full-bridge converter, then the first input terminal can be connected to a DC input, the second input terminal can be connected to two gate drive signals to drive the power switches in one leg of the full-bridge converter, and the third input terminal can be connected to two gate drive signals to drive the power switches in the other leg of the full-bridge converter. The PCB 2210 also includes six through holes 2270 in which legs from the second plate 2230 pass through and contact the first plate 2200.

Traces on or in the PCB 2210 can define the primary and secondary windings and can extend around the through holes 2270, and thus around the legs of the second plate 2240. The primary and secondary windings can be located on a single layer or on multiple layers on or within the PCB 2210. The primary windings can be connected in series or can be connected in parallel as shown in FIGS. 18A and 18B. As shown in FIGS. 18A and 18B, the secondary windings in each pair of secondary windings can be connected together, and the pairs of secondary windings can be disconnected from each other.

Although FIG. 22 shows that the legs extend from the second plate 2230, other arrangements are also possible. For example, some of the legs can extend from the second plate 2230 and some of the legs can extend from the first plate 2220, or six legs can extend from the second plate 2230 and six corresponding legs can extend from the first plate 2220 such that legs of the second plate 2230 contact the corresponding legs from the first plate 2220 in the through holes 2270. In the DC-DC converter 2200, each isolated output can be regulated by adding a post-stage regulator, including, for example, either a buck converter or a low-dropout (LDO) regulator, if regulation is needed. Components 2260 of both the primary and secondary circuits of the converter 2200 can be located on the same PCB 2210 as the transformer windings, resulting in a very compact design with simple assembly. As shown in the schematic of FIG. 18, the primary windings of all the transformer legs can be connected in parallel to achieve balanced output voltages of all the isolated output channels. Due to the design modularity, additional PCBs can be stacked to increase the number of output channels, as shown in FIGS. 23 and 24.

The isolated DC-DC converters 2300, 2400 of FIGS. 23 and 24 provide twelve isolated outputs and can be used to implement the isolated power supplies 1800, 1850 in FIGS. 18A and 18B, with six isolated outputs provided one PCB 2310 or 2410 and another six isolated outputs provided by another PCB 2315 or 2415. The turns of the primary windings on and/or in the PCBs 2310, 2315 or 2410, 2415 can be connected in parallel like the primary windings P1 in FIG. 18A or can be connected in series like the primary windings P1 in FIG. 18B.

As shown in FIG. 23, an isolated DC-DC converter 2300 with twelve output channels is provided by stacking two PCBs 2310 and 2315. FIG. 23 shows that the isolated DC-DC converter 2300 includes two PCBs 2210 and 2315, a first plate 2320, a second plate 2330, and a middle plate core 2325. The PCB 2310 includes three input terminals 2340, twelve outputs at output terminals 2350, and circuit components 2260. The PCBs 2310 and 2315 also both include six through holes 2370 in which legs from the first plate 2320 and the second plate 2330 pass through and contact the middle plate core 2325. The two PCBs 2310 and 2315 are stacked up and separated by the middle plate core 2325 in the arrangement shown in FIG. 23.

If the first and second plates are stacked as shown in FIGS. 7G and 7H, i.e., a stacked matrix transformer is used, then the magnetic flux can be canceled in the middle plate core 2325. Due to the magnetic flux cancellation in the middle plate core 2325, the transformer structure can be further simplified by removing the middle plate core 2325, resulting in only one core set as shown in FIG. 24. That is, the DC-DC converter 2400 in FIG. 24 is like the DC-DC converter 2300 in FIG. 23 but without a middle plate core. The DC-DC converter 2400 includes two PCBs 2410 and 2415, a first plate 2420, and a second plate 2430. The PCB 2410 includes three input terminals 2440, twelve outputs at output terminals 2450, and circuit components 2460. The PCBs 2410 and 2415 also both include six through holes 2470 in which legs from the first and second plates 2320 and 2330 pass through and contact each other, without a middle plate core. The two PCBs 2410 and 2415 are oriented with required spacing to provide proper voltage isolation, and an insulator sheet can be placed between the two PCBs 2410 and 2415.

The arrangement of the DC-DC converter 2400 shown in FIG. 24 allows for a DC or AC input voltage to be converted into multiple isolated output using a compact structure including input terminals 2440, output terminals 2450, a stacked transformer with magnetic flux cancellation, and area on the two PCBs 2410 and 2415 to include components for a primary side full-bridge or half-bridge converter, and components for a secondary side rectifier and/or output filter or other associated circuitry.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A transformer assembly comprising:
   a top core; and
   a bottom core under the top core;
   a primary winding that is multi-layered and that extends around each of the top core and the bottom core;
   a secondary winding that is multi-layered and that extends around each of the top core and the bottom core;
   a top printed circuit board (PCB) that includes two holes;
   a bottom PCB that includes two holes and that is spaced away from the top PCB to define a space between the top PCB and the bottom PCB;
   two legs that connect the top core and the bottom core and that extend through the two holes in the top PCB and the two holes in the bottom PCB; wherein the top PCB and the bottom PCB include turns of the primary winding and turns of the secondary winding; and
   the primary winding extends around the two legs such that, when current flows in the primary winding, magnetic flux is canceled or substantially canceled in the space between the top PCB and the bottom PCB.

2. The transformer assembly of claim 1, wherein
   the turns of the primary winding included in the top PCB are connected in series, and the turns of the primary winding included in the bottom PCB are connected in series; and
   the turns of the secondary winding included in the top PCB are connected in parallel, and the turns of the secondary winding included in the bottom PCB are connected in parallel.

3. The transformer assembly of claim 1, further comprising a power pin that connects the turns of the primary winding on the top PCB in series with the turns of the primary winding on the bottom PCB; wherein
   the turns of the primary winding on the top PCB are connected in series by vias; and
   the turns of the primary windings on the bottom PCB are connected in series by vias.

4. The transformer assembly of claim 1, wherein
   the turns of the secondary winding are located on top and bottom surfaces of the top PCB and on top and bottom surfaces of the bottom PCB; and
   the turns of the primary winding are located on middle surfaces between the top and bottom surfaces of the top PCB and on middle surfaces between the top and bottom surfaces of the bottom PCB.

5. The transformer assembly of claim 1, wherein an electronic component of a rectifier circuit is located on at least one of the top and bottom surfaces of the top PCB and the top and bottom surfaces of the bottom PCB.

6. The transformer assembly of claim 1, further comprising four additional legs; wherein
   the top PCB includes four additional holes;
   the bottom PCB includes four additional holes; and
   the two legs and the four additional legs define six legs that are arranged in a 2×3 array and that extend through corresponding holes of the two holes and the four additional holes in the top PCB and in the bottom PCB;
   the primary winding is wound around each of the six legs such that the primary winding is wound around adjacent legs in the 2×3 array in opposite directions.

7. The transformer assembly of claim 1, further comprising positive and negative bus bars connected to the secondary winding.

8. The transformer assembly of claim 1, further comprising a plate core located between the top and bottom cores.

9. The transformer assembly of claim 1, further comprising a shielding layer located between the primary and secondary windings.

10. The transformer assembly of claim 1, wherein the secondary winding provides isolated outputs.

11. The transformer assembly of claim 1, wherein the secondary winding provides a single output.

12. The transformer assembly of claim 1, further comprising four additional legs; wherein
   the two legs and the four additional legs define six legs that are arranged in a 2×3 array; and
   the primary winding is wound around each of the six legs such that the primary winding is wound around adjacent legs in the 2×3 array in opposite directions.

13. A converter assembly comprising:
   the transformer assembly of claim 1;
   a primary-side circuit including the primary windings; and
   a secondary-side circuit including the secondary windings.

14. The converter assembly of claim 13, wherein the primary-side circuit includes a first primary-side switch and a second primary-side switch connected to an input voltage.

15. The converter assembly of claim 14, wherein the primary-side circuit includes a capacitor and an inductor connected between the first primary-side switch and the second primary-side switch and the transformer assembly.

16. The converter assembly of claim 13, wherein the secondary-side circuit includes synchronous rectifiers.

17. A transformer assembly comprising:
  a core including top and bottom plates connected by six legs arranged in a 2×3 array;
  a primary winding wound around each of the six legs such that the primary winding is wound around adjacent legs in the 2×3 array in opposite directions; and
  a secondary winding wound around each of the six legs such that the secondary winding provides six isolated outputs; wherein
  when current flows in the primary winding, magnetic flux in the top and bottom plates is a portion of the magnetic flux in each of the six legs.

18. A converter assembly comprising:
  the transformer assembly of claim 17; and
  a first printed circuit board (PCB) that includes six holes through which the six legs of the core extend; wherein
  the primary and the secondary windings are located on and/or in the first PCB.

19. The converter assembly of claim 18, further comprising a second PCB that includes six holes through which the six legs of the core extend; wherein
  the primary and the secondary windings are located on and/or in the second PCB; and
  the secondary winding provides six additional isolated outputs.

20. The converter assembly of claim 19, further comprising a plate core located between the top and bottom plates.

* * * * *